United States Patent
Tanikawa et al.

(10) Patent No.: US 8,819,680 B2
(45) Date of Patent: Aug. 26, 2014

(54) COMPUTER SYSTEM FOR CONTROLLING THE EXECUTION OF VIRTUAL MACHINES

(75) Inventors: Tadao Tanikawa, Kanagawa (JP); Katsushige Amano, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 287 days.

(21) Appl. No.: 13/395,752

(22) PCT Filed: Jun. 9, 2011

(86) PCT No.: PCT/JP2011/003280
§ 371 (c)(1),
(2), (4) Date: Mar. 13, 2012

(87) PCT Pub. No.: WO2011/161893
PCT Pub. Date: Dec. 29, 2011

(65) Prior Publication Data
US 2012/0174098 A1 Jul. 5, 2012

(30) Foreign Application Priority Data

Jun. 25, 2010 (JP) ................................ 2010-144878

(51) Int. Cl.
G06F 9/455 (2006.01)
G06F 9/48 (2006.01)
G06F 9/50 (2006.01)

(52) U.S. Cl.
CPC .......... G06F 9/45533 (2013.01); G06F 9/4825 (2013.01); G06F 9/5077 (2013.01)
USPC ............................................................ 718/1

(58) Field of Classification Search
None
See application file for complete search history.

(56) References Cited

U.S. PATENT DOCUMENTS

| 5,349,680 A | 9/1994 | Fukuoka | |
|---|---|---|---|
| 2006/0174246 A1* | 8/2006 | Tamura et al. | 718/100 |
| 2007/0106827 A1* | 5/2007 | Boatright et al. | 710/263 |
| 2009/0259870 A1* | 10/2009 | Sharma et al. | 713/400 |
| 2010/0138208 A1* | 6/2010 | Hattori et al. | 703/25 |

FOREIGN PATENT DOCUMENTS

| JP | 4-182834 | 6/1992 |
|---|---|---|
| JP | 5-158710 | 6/1993 |
| JP | 2001-166954 | 6/2001 |
| JP | 2006-209479 | 8/2006 |
| JP | 2010-128911 | 6/2010 |

OTHER PUBLICATIONS

International Search Report issued Sep. 20, 2011 in corresponding International Application No. PCT/JP2011/003280.

* cited by examiner

*Primary Examiner* — Emerson Puente
*Assistant Examiner* — Dong Kim
(74) *Attorney, Agent, or Firm* — Wenderoth, Lind & Ponack, L.L.P.

(57) ABSTRACT

A computer system enables two virtual machines with use of two virtual CPUs. The computer system includes a CPU that is allocated to the virtual CPU when the virtual CPU performs computer processing of the virtual machine other than timer processing; a tick CPU that is dedicated to timer processing and is allocated to the virtual CPU upon receiving an interrupt request (tick interrupt) for causing the virtual CPU to perform timer processing of the virtual machine; and interrupt controller that issues the tick interrupt to the tick CPU.

9 Claims, 19 Drawing Sheets

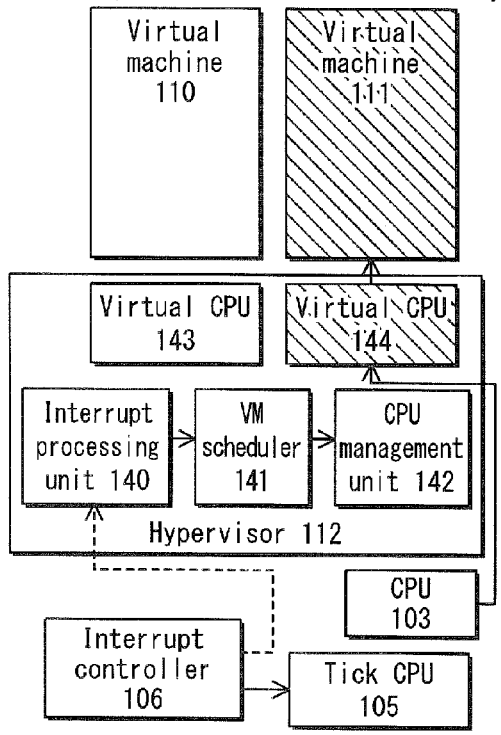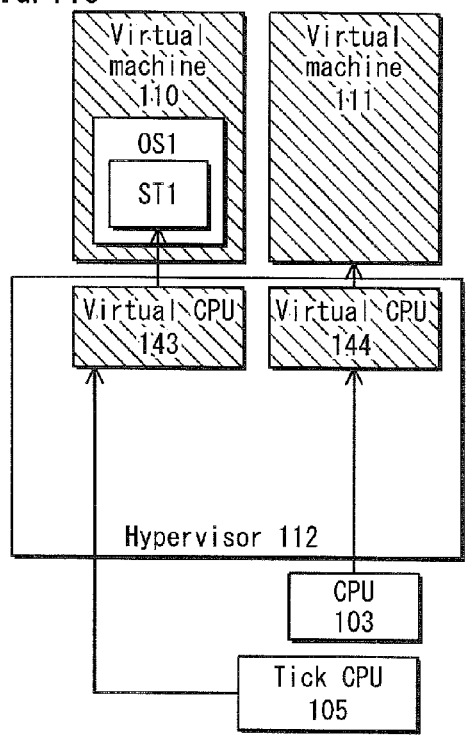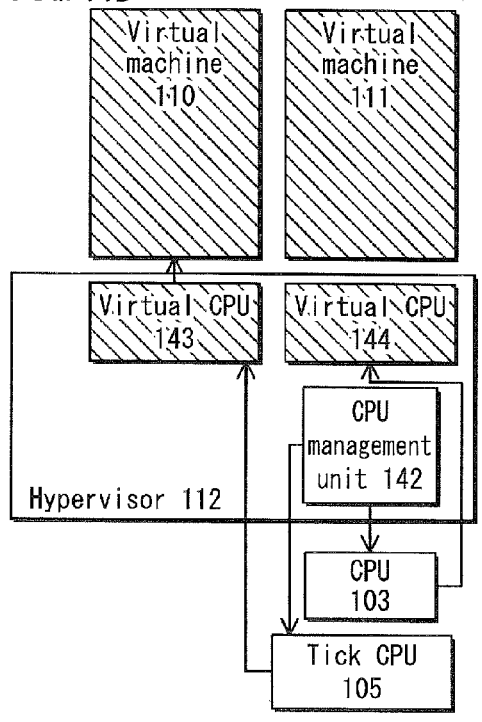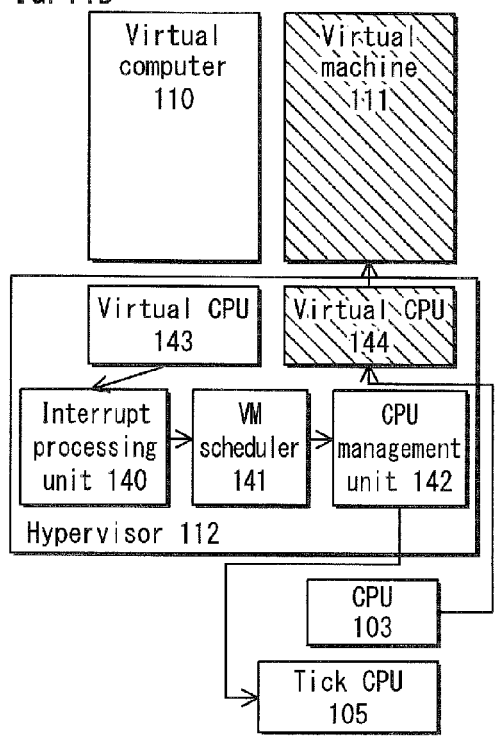

COMPUTER SYSTEM FOR CONTROLLING THE EXECUTION OF VIRTUAL MACHINES

BACKGROUND OF INVENTION

1. Technical Field

The present invention relates to a computer system that enables a plurality of virtual machines

2. Background Art

As shown in FIG. 17, there is a conventionally-known computer system in which a plurality of (two in FIG. 17) virtual machines 310 and 311 managed by different operating systems (OS11 and OS12 in FIG. 17) are enabled as a result of one central processing unit (CPU) 300 executing a program stored in memory 302 (see, for example, Patent Literature 1 and Patent Literature 2). Note that FIG. 17 conceptually illustrates the virtual machines 310 and 311, etc. being enabled as a result of the CPU 300 executing the program stored in the memory 302. The virtual machines 310 and 311, etc. are not the actual constituent elements of the memory 302.

This type of computer system includes a hypervisor 312 composed of virtual CPUs (virtual processing units) 343 and 344 that respectively execute the virtual machines 310 and 311. The hypervisor 312 may have a function of allocating the CPU 300 to the virtual CPUs 343 and 344 alternately. The hypervisor 312 is also referred to as a virtual machine (VM) monitor or a hardware partition control unit.

In this computer system, the virtual machine 310 executes tasks T11 and T12, and the virtual machine 311 executes tasks T21 and T22. The hypervisor 312 manages a time schedule according to which the CPU 300 executes each of the virtual machines 310 and 311. The hypervisor 312, also, is enabled as a result of the CPU 300 executing a corresponding program stored in the memory 302.

Incidentally, the computer system illustrated in FIG. 17 performs processing for advancing the values counted by system timers ST1 and ST2 in a predetermined cycle (timer processing). Note, the system timers ST1 and ST2 respectively define the internal times of the operating systems OS11 and OS12. This timer processing is performed to advance the internal times of the operating systems OS11 and OS12. More specifically, this timer processing is carried out by the CPU 300 executing an interrupt handler (tick handler) in accordance with an interrupt request (tick interrupt). The interrupt request is issued in a predetermine cycle (e.g., every 5 ms or 10 ms in the case of a UNIX™ operating system) by an interrupt controller 306 connected to a hardware timer 307. Note that each of the hardware timer 307 and the interrupt controller 306 is configured with hardware different from the CPU 300 and the like.

The above timer processing can be performed in a conventional method whereby, each time the interrupt controller 306 issues a tick interrupt to the virtual machine 310 while the virtual machine 311 is operating but the virtual machine 310 is not, the CPU 300 stops the computer processing of the virtual machine 311 so as to perform the timer processing of the virtual machine 310. That is to say, this method temporarily switches from the virtual machine 311 to the virtual machine 310 only to perform the timer processing.

However, upon switching from the virtual machine 311 to the virtual machine 310, this method temporarily relocates data (e.g., register information) used by the virtual CPU 344 that executes the virtual machine 311 within the memory 302—i.e., moves the data from a CPU working area to a save area different from the CPU working area. Thereafter, another data used by the virtual CPU 343 that executes the virtual machine 310 is loaded to the CPU working area. Note, the CPU working area is an area where the register information or the like for enabling a virtual CPU is stored. However, the overhead increases as a result of (i) relocating data from the CPU working area to the save area in the memory 302, and (ii) loading another data to the CPU working area. This could lower the processing efficiency of the entire computer system.

To address the above issue, there is a conventional method for performing the timer processing at a certain timing (see Patent Literature 1). More specifically, in a computer system that enables two virtual machines (first virtual machine and second virtual machine), this method (i) does not perform the timer processing of the first virtual machine when the first virtual machine is not operating, even if a tick interrupt is issued to the first virtual machine by an interrupt request issuing unit that is configured with hardware different from the CPU and the like, and (ii) performs the timer processing of the first virtual machine upon next execution of the first virtual machine (upon switching from the second virtual machine to the first virtual machine). Upon switching from the second virtual machine to the first virtual machine, this method advances the value counted by a system timer of the first virtual machine by a period of time for which the first virtual machine was not operating.

This method does not switch from the virtual machine 311 to the virtual machine 310 when the virtual machine 310 is not operating, even if a tick interrupt is issued to the virtual machine 310. Hence, using this method makes it possible to decrease the overhead associated with the switching between the virtual machines 310 and 311.

In addition, there is also a conventional virtual machine system that alternately executes a plurality of operating systems (in other words, executes a plurality of virtual machines managed by different operating systems alternately) (see Patent Literature 2). If an interrupt request issuing unit issues a tick interrupt to one of the operating systems that is not operating, this virtual machine system performs timer processing associated with the issued tick interrupt at once during an operating period that is next allocated to this operating system.

In this virtual machine system, if the interrupt request issuing unit issues a tick interrupt to one of the operating systems that is not being executed, the hypervisor (hardware partition control unit) only counts the number of times the tick interrupt is issued.

Then, the hypervisor adds (i) the number of times the tick interrupt was issued while this operating system was not operating and (ii) the number of times the tick interrupt will be issued during the operating period that is next allocated to this operating system. The hypervisor divides the operating period that is next allocated to this operating system by a value obtained by the above addition, and regards a value obtained by the above division as a cycle in which new timer processing will be performed.

This virtual machine system, too, does not switch between operating systems when a tick interrupt is issued to one of the operating systems that is not being executed. Accordingly, this virtual machine system can also decrease the overhead associated with the switching between the operating systems.

CITATION LIST

Patent Literature

[Patent Literature 1]
JP Patent Application Publication No. H05-158710
[Patent Literature 2]
JP Patent Application Publication No. 2001-166954

SUMMARY OF INVENTION

However, with the technology described in Patent Literature 1, the virtual machine 310 is re-executed at time T2, and at the same time, the tick interrupt is newly started at time T2, as illustrated in FIG. 18. Consequently, the timings at which the tick interrupt is issued from time T2 may differ from the timings at which the tick interrupt would have been issued if the virtual machine 310 were continuously executed past time T1, T2, and so on. For example, if the time period for which the virtual machine 310 is not operating (from time T1 to time T2) is not an integral multiple of the cycle in which the tick interrupt is issued to the virtual machine 310, the above difference in the timings may occur (see the bold arrows and dotted arrows in FIG. 18). In this case, if the task executed by the virtual machine 310 includes a certain type of processing, then this task may not be executed properly. The certain type of processing is, specifically, processing that is performed when the following time period has elapsed since a predetermined reference time: a time period that is (i) an integral multiple of the cycle in which the tick interrupt is issued and (ii) longer than the cycle in which the switching between the virtual machines 310 and 311 is performed.

Furthermore, the technology described in Patent Literature 1 does not use any means for counting the number of times the tick interrupt is issued by the interrupt request issuing unit to the virtual machine 310 while the virtual machine 310 is not operating. Therefore, if the time period for which the virtual machine 310 is not operating is longer than the cycle of the system timer, the technology described in Patent Literature 1 does not count the number of times the tick interrupt is supposed to be issued while the virtual machine 310 is not operating (see the dotted arrows between time T1 and time T2 in FIG. 18). This gives rise to the possibility that the virtual machine 310 cannot properly execute a task including processing performed based on the counted number of times the tick interrupt is supposed to be issued.

On the other hand, as to the technology described in Patent Literature 2, when the two operating systems OS11 and OS12 are executed alternately, there is a fluctuation in the cycle in which the tick interrupted is issued during the operating period allocated to the operating system OS11, as shown in FIG. 19 (e.g., the cycle in which the tick interrupt is issued until time T1 (the normal arrows in FIG. 19) differs from the cycle in which the tick interrupt is issued at time T2 onward (the bold arrows in FIG. 19)). In this case, if an application program (task) executed by the virtual machines and a peripheral device controlled by the virtual machines operate based on a trigger issued in a predetermined cycle and use a tick interrupt as a trigger, then the cycle in which the trigger is issued may fluctuate. As a result, such an application program and a peripheral device may not operate properly.

In addition, the cycle in which the tick interrupt is issued may fluctuate if the operating system OS11 includes processing to wait for input from a user interface for a predetermined time period (wait-for-input processing) and counts time based on the cycle in which the tick interrupt is issued. This gives rise to the possibility that the wait-for-input processing cannot be performed properly.

In other words, the technologies described in Patent Literature 1 and Patent Literature 2 may cause abnormal execution of processing that needs to be executed real-time in response to the interrupt request issued by the interrupt request issuing unit in a predetermined cycle.

The present invention has been conceived in view of the above problems, and aims to provide a computer system that can prevent abnormal operations of peripheral devices as well as abnormality in tasks that are executed real-time in response to an external interrupt request, while decreasing the overhead associated with the switching between virtual machines.

A computer system pertaining to the present invention causes a plurality of virtual processing units to execute a plurality of virtual machines, the plurality of virtual processing units including a first virtual processing unit and a second virtual processing unit, the plurality of virtual machines including a first virtual machine and a second virtual machine. The computer system includes: a first processing device comprising a physical resource that performs computer processing, the first processing device being allocated to (i) the first virtual processing unit when the first virtual processing unit performs first processing of the first virtual machine, and (ii) the second virtual processing unit when the second virtual processing unit performs first processing of the second virtual machine; a second processing device comprising a physical resource that performs computer processing and dedicated to second processing of the first virtual machine and to second processing of the second virtual machine, the second processing device being allocated to (i) the first virtual processing unit upon receiving a first interrupt request for causing the first virtual processing unit to perform the second processing of the first virtual machine, and (ii) the second virtual processing unit upon receiving a second interrupt request for causing the second virtual processing unit to perform the second processing of the second virtual machine; and an interrupt controller configured to issue one of the first interrupt request and the second interrupt request to the second processing device.

With the above structure, in order to execute the second processing of the first virtual machine while the first processing of the second virtual machine is being performed with the first processing device allocated to the second virtual processing unit, there is no need to change the virtual processing unit to which the first processing device is allocated from the second virtual processing unit to the first virtual processing unit. Thus, the above structure can reduce the overhead associated with the switching between virtual processing units to execute a virtual machine. Furthermore, because the second virtual processing unit to which the second processing device is allocated performs the second processing in real-time compliance with the second interrupt request issued by the interrupt controller, the above structure makes it possible to maintain the real-time status of the second processing of each virtual machine.

In the computer system pertaining to the present invention, the second processing of the first virtual machine and the second processing of the second virtual machine may advance values counted by system timers that define internal times of a plurality of operating systems which manage, in one-to-one correspondence, the plurality of virtual machines.

The above structure makes it possible to maintain the real-time status of processing for updating the values counted by the system timers of the operating systems which manage the virtual machines.

The computer system pertaining to the present invention may further comprise a processing device management unit configured to, when the interrupt controller issues the first interrupt request to the second processing device while the first processing device is allocated to the first virtual processing unit, (i) cause the first processing device to stop operating, (ii) cancel the allocation of the first processing device to the first virtual processing unit, and (iii) allocate the second processing device to the first virtual processing unit.

With the above structure, when the interrupt controller issues to the second processing device an interrupt for causing the first virtual processing unit to perform the first processing of the virtual machine, the processing device management unit causes the first processing device to stop operating, cancels the allocation of the first processing device to the first virtual processing unit, and allocates the second processing device to the first virtual processing unit. This allows properly switching between physical resources to be allocated to the first virtual processing unit depending on the processing performed by the first virtual processing unit. Accordingly, the above structure makes effective use of the physical resource that is most suitable for the processing performed by the first virtual processing unit.

In the computer system pertaining to the present invention, when the interrupt controller issues the first interrupt request to the second processing device while the second processing device is allocated to the second virtual processing unit, the processing device management unit may allocate the second processing device to the first virtual processing unit.

With the above structure, when the interrupt controller issues to the second processing device an interrupt for causing the second virtual processing unit to perform the second processing of the virtual machine while the first processing device is allocated to the first virtual processing unit, the processing device management unit allocates the second processing device to the second virtual processing unit. This enables the second virtual processing unit to perform the second processing without halting the first processing performed by the first virtual processing unit. Therefore, the above structure can improve the processing efficiency of the entire computer system.

The computer system pertaining to the present invention may be structured such that (i) the plurality of virtual processing units further include a third virtual processing unit, (ii) the first virtual machine is (a) managed by an operating system compatible with multiprocessing and (b) executed by the first virtual processing unit and the third virtual processing unit, and (iii) upon receiving a third interrupt request for causing the third virtual processing unit to perform the second processing of the first virtual machine, the second processing device is allocated to the third virtual processing unit.

With the above structure, the second processing of the first virtual machine can be performed without halting the first processing of the first virtual machine. Accordingly, the above structure can improve the processing efficiency of the entire computer system.

In the computer system pertaining to the present invention, the second processing device may consume a smaller amount of power than the first processing device does.

The above structure can reduce the amount of power consumed by the entire computer system as a result of performing the second processing with use of the second processing device that consumes a smaller amount of power than the first processing device does.

The present invention may be a processing method used in a computer system that causes a plurality of virtual processing units to execute a plurality of virtual machines, the plurality of virtual processing units including a first virtual processing unit and a second virtual processing unit, the plurality of virtual machines including a first virtual machine and a second virtual machine, the computer system including: (i) a first processing device comprising a physical resource that performs computer processing, the first processing device being allocated to (a) the first virtual processing unit when the first virtual processing unit performs first processing of the first virtual machine, and (b) the second virtual processing unit when the second virtual processing unit performs first processing of the second virtual machine; (ii) a second processing device comprising a physical resource that performs computer processing and dedicated to second processing of the first virtual machine and to second processing of the second virtual machine, the second processing device being allocated to (a) the first virtual processing unit upon receiving a first interrupt request for causing the first virtual processing unit to perform the second processing of the first virtual machine, and (b) the second virtual processing unit upon receiving a second interrupt request for causing the second virtual processing unit to perform the second processing of the second virtual machine; and (iii) an interrupt controller configured to issue one of the first interrupt request and the second interrupt request to the second processing device. Here, the processing method comprises a processing device switching step of, when the interrupt controller issues the first interrupt request to the second processing device while the first processing device is allocated to the first virtual processing unit, (i) causing the first processing device to stop operating, (ii) cancelling the allocation of the first processing device to the first virtual processing unit, and (iii) allocating the second processing device to the first virtual processing unit.

With the above structure, when the interrupt controller issues to the second processing device an interrupt for causing the first virtual processing unit to perform the first processing of the virtual machine, the first processing device stops operating, the allocation of the first processing device to the first virtual processing unit is cancelled, and the second processing device is allocated to the first virtual processing unit. This allows properly switching between physical resources to be allocated to the first virtual processing unit depending on the processing performed by the first virtual processing unit. Accordingly, the above structure makes effective use of the physical resource that is most suitable for the processing performed by the first virtual processing unit.

In the computer system pertaining to the present invention, when the interrupt controller issues the second interrupt request to the second processing device while the first processing device is allocated to the first virtual processing unit, the processing device switching step may allocate the second processing device to the second virtual processing unit.

With the above structure, when the interrupt controller issues to the second processing device an interrupt for causing the second virtual processing unit to perform the second processing of the virtual machine while the first processing device is allocated to the first virtual processing unit, the processing device management unit allocates the second processing device to the second virtual processing unit. This enables the second virtual processing unit to perform the second processing without halting the first processing performed by the first virtual processing unit. Therefore, the above structure can improve the processing efficiency of the entire computer system.

The present invention may be an integrated circuit for a computer system that causes a plurality of virtual processing units to execute a plurality of virtual machines, the plurality of virtual processing units including a first virtual processing unit and a second virtual processing unit, the plurality of virtual machines including a first virtual machine and a second virtual machine. Here, the integrated circuit comprises: a first processing device comprising a physical resource that performs computer processing, the first processing device being allocated to (i) the first virtual processing unit when the first virtual processing unit performs first processing of the first virtual machine, and (ii) the second virtual processing unit when the second virtual processing unit performs first processing of the second virtual machine; a second processing device comprising a physical resource that performs computer processing and dedicated to second processing of the first virtual machine and to second processing of the second virtual machine, the second processing device being allocated to (i) the first virtual processing unit upon receiving a first interrupt request for causing the first virtual processing unit to perform the second processing of the first virtual machine, and (ii) the second virtual processing unit upon receiving a second interrupt request for causing the second virtual processing unit to perform the second processing of the second virtual machine; and an interrupt controller configured to issue one of the first interrupt request and the second interrupt request to the second processing device.

The above structure can reduce the scale of the computer system.

BRIEF DESCRIPTION OF DRAWINGS

FIGS. 11A to 11D illustrate the operations of the computer system pertaining to Embodiment 1.

DETAILED DESCRIPTION OF INVENTION

Embodiment 1

<1> Structure

<1-1> Overall Structure

Figure 1:
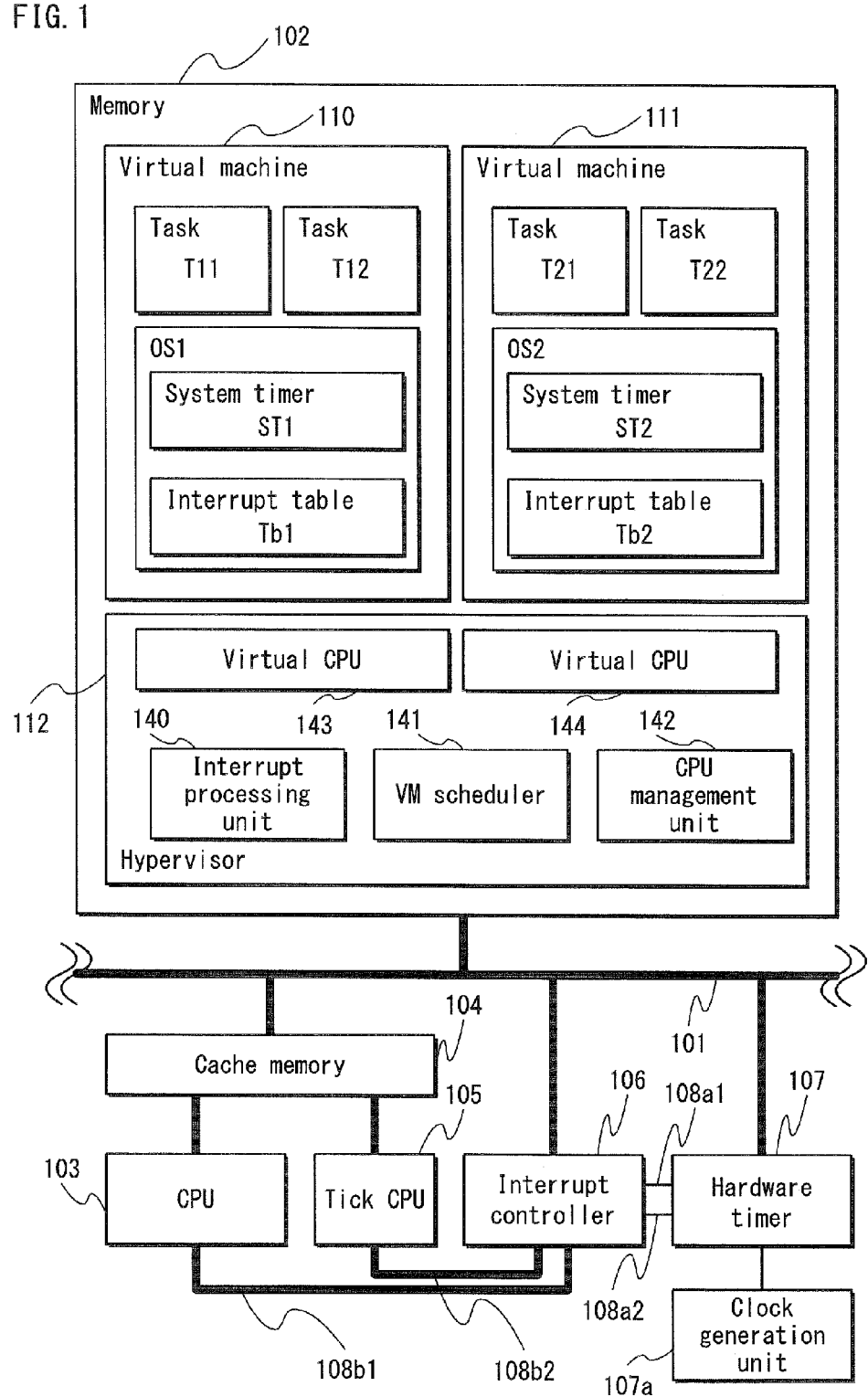
FIG. 1 shows an overall structure of a computer system pertaining to Embodiment 1.

FIG. 1 shows an overall structure of a computer system pertaining to the present embodiment.

The computer system includes memory 102, a central processing unit (CPU) 103, cache memory 104, a tick CPU 105, an interrupt controller 106, and a hardware timer 107.

The memory 102, the CPU 103, the cache memory 104, the tick CPU 105, the interrupt controller 106 and the hardware timer 107 are connected to one another via buses 101.

The CPU 103 enables virtual CPUs 143 and 144 by reading and executing a program stored in the memory 102. The virtual CPUs 143 and 144 perform computer processing of virtual machines 110 and 111 (described later). Here, the CPU 103 is allocated to the virtual CPUs 143 and 144 alternately.

The tick CPU 105 is configured with a processor with a lower speed and a smaller scale than the processor of the CPU 103. Accordingly, the tick CPU 105 consumes a smaller amount of power and requires a lower cost than the CPU 103 does. The tick CPU 105 is allocated to one of the virtual CPUs 143 and 144 only when performing timer processing, which is to advance the system timers ST1 and ST2 that respectively define the internal times of the virtual machines 110 and 111. The "<2> Operations" section below will provide a detailed description of operations that are performed upon the timer processing in the computer system pertaining to the present embodiment.

The memory 102 is constituted from a dynamic random access memory (DRAM) or the like. Furthermore, the memory 102 includes a CPU working area 102a1, a tick CPU working area 102a2, a first save area 102b and a second save area 102c. The CPU working area 102a1 stores therein pieces of data D1 and D2 that include register information and the like and are respectively used to allocate the CPU 103 to the virtual CPUs 143 and 144, which will be described later (see FIGS. 3A and 3B). The tick CPU working area 102a2 stores therein pieces of data D1a and D2a that include register information and the like and are respectively used to allocate the tick CPU 105 to the virtual CPUs 143 and 144 (see FIGS. 4A and 4B). The first save area 102b and the second save area 102c are the areas where the pieces of data D1, D2 and D1a are temporarily saved.

That is to say, the data D1 is required to allocate the CPU 103 to the virtual CPU 143 so that the virtual CPU 143 can perform computer processing of the virtual machine 110 other than the timer processing, whereas the data D2 is required to allocate the CPU 103 to the virtual CPU 144 so that the virtual CPU 144 can perform computer processing of the virtual machine 111 other than the timer processing. The pieces of data D1a and D2a are respectively required to allocate the tick CPU 105 to the virtual CPUs 143 and 144 so that the virtual CPUs 143 and 144 can perform the timer processing of the virtual machines 110 and 111.

The cache memory 104 is constituted from a static random access memory (SRAM) or the like. The cache memory 104 temporarily stores therein (i) a command included in a program read by the CPU 103 or the tick CPU 105 from the memory 102, and (ii) data used by the CPU 103 or the tick CPU 105 upon execution of a program. The cache memory 104 also temporarily stores therein data written by the CPU 103 or the tick CPU 105 to the memory 102.

Figure 2A:
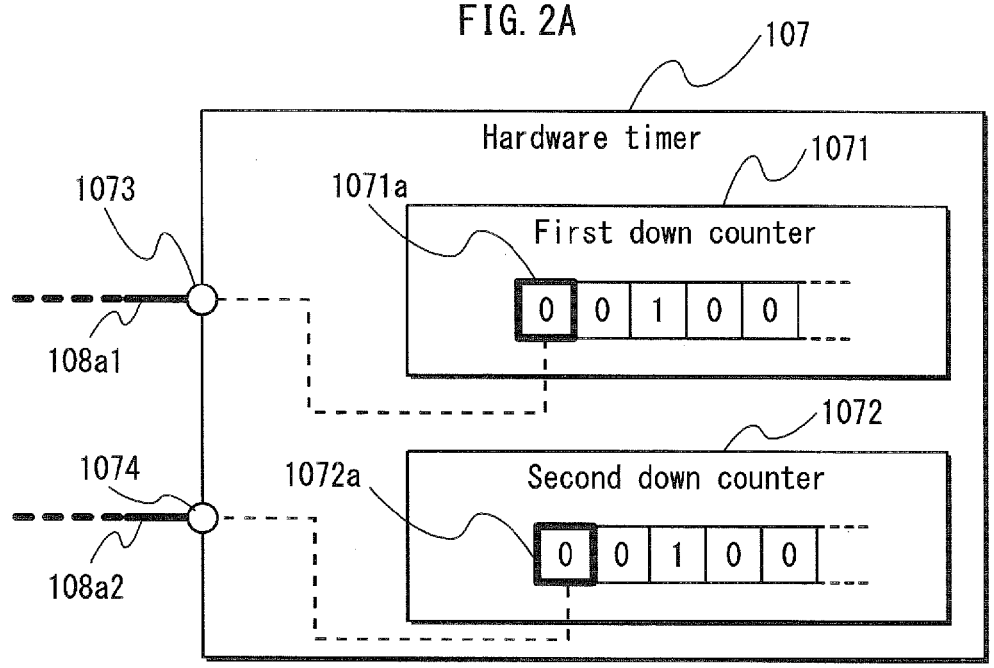
FIGS. 2A and 2B illustrate the operations of a hardware timer, which is one of constituent elements of the computer system pertaining to Embodiment 1.
Figure 2B:
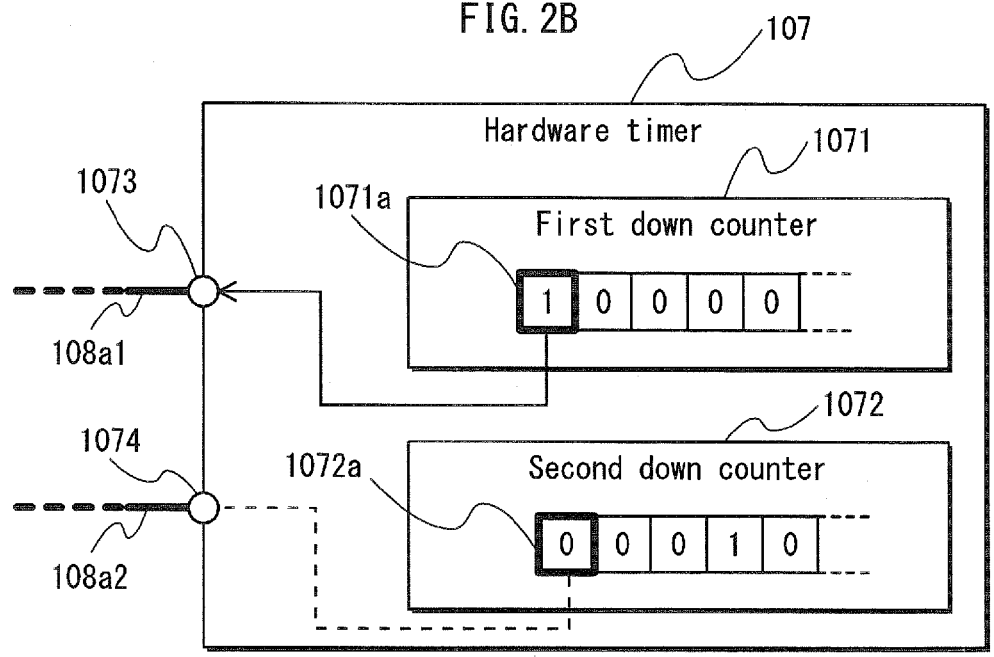

As shown in FIG. 2A, the hardware timer 107 is composed of a first signal output port 1073, a second signal output port 1074, a first down counter 1071 and a second down counter 1072. The first signal output port 1073 and the second signal output port 1074 output interrupt request signals. The first down counter 1071 determines the timing when an interrupt request signal is output from the first signal output port 1073. The second down counter 1072 determines the timing when an interrupt request signal is output from the second signal output port 1074. The first signal output port 1073 and the second signal output port 1074 are connected to the interrupt controller 106 via interrupt request signal lines 108a1 and 108a2, respectively. The first down counter 1071 and the second down counter 1072 are connected to a clock generation unit 107a, and decrement the values therein based on a clock signal input from the clock generation unit 107a. The signal output ports 1073 and 1074 respectively output a value of a coded bit 1071a in the first down counter 1071 and a value of a coded bit 1072a in the second down counter 1072. In this way, for example, when the coded bit in the first down counter 1071 is updated to "1" owing to an underflow occurring in a value of the first down counter 1071 as shown in FIG. 2B, an interrupt request signal is output from the first signal output port 1073 to the interrupt controller 106.

The interrupt controller 106 is configured with a general-purpose programmable interrupt controller (PIC), and includes a first signal input terminal and a second signal input terminal (not illustrated). The interrupt request signal output from the first signal output port 1073 is input to the first signal input terminal. The interrupt request signal output from the second signal output port 1074 is input to the second signal input terminal. The interrupt controller 106 further includes a first interrupt output terminal and a second interrupt output terminal (not illustrated). The first interrupt output terminal outputs an interrupt request when the interrupt request signal is input to the first signal input terminal. The second interrupt output terminal outputs an interrupt request when the interrupt request signal is input to the second signal input terminal. The first interrupt output terminal is connected to the CPU 103 via an interrupt signal line 108b1. The second interrupt output terminal is connected to the tick CPU 105 via an interrupt signal line 108b2. The interrupt controller 106 issues an interrupt request to the CPU 103 or the tick CPU 105 in accordance with the type of the signal input terminal to which the interrupt request signal is input from the hardware timer 107. For example, when the interrupt request signal is input to the first signal input terminal, the interrupt controller 106 issues a tick interrupt to the tick CPU 105. The tick interrupt is an interrupt request that causes the virtual CPU 143 to perform the timer processing of the virtual machine 110 (equivalent to the second processing).

Furthermore, the interrupt controller 106 stores therein interrupt request information including, for example, identification information for the interrupt output terminal from which the interrupt request has been output.

<1-2> Hypervisor

As shown in FIG. 1, the hypervisor 112 is composed of the virtual CPUs 143 and 144, an interrupt processing unit 140, a virtual machine (VM) scheduler 141, and a CPU management unit 142. The hypervisor 112 manages vectors for identifying handlers to be executed thereby in response to the interrupt request issued by the interrupt controller 106. The handlers identified by these vectors include a handler that, when the CPU 103 receives an interrupt request from the interrupt controller 106, makes the interrupt processing unit 140 (described later) to identify the type of the interrupt request and the virtual machine 110 or 111 to be interrupted. Note that FIG. 1 conceptually illustrates the hypervisor 112 being enabled by the CPU 103 executing a program stored in the memory 102. The hypervisor 112 is not an actual constituent element of the memory 102.

The virtual CPUs 143 and 144 are enabled by the CPU 103. The virtual CPU 143 is equivalent to a first virtual processing unit, whereas the virtual CPU 144 is equivalent to a second virtual processing unit.

When the interrupt controller 106 issues an interrupt request, the interrupt processing unit 140 identifies the type of the interrupt request and the virtual machine 110 or 111 to be interrupted by executing an interrupt handler in accordance with interrupt vectors managed by the hypervisor 112. The interrupt processing unit 140 then notifies the VM scheduler 141 of the identified type of the interrupt request and the identified virtual machine 110 or 111 to be interrupted. At this time, the interrupt processing unit 140 accesses the interrupt request information stored in the interrupt controller 106 to identify the type of the interrupt request and the virtual machine 110 or 111 to be interrupted.

Normally, the VM scheduler 141 repeatedly alternates execution of the virtual machine 110 by the virtual CPU 143 and execution of the virtual machine 111 by the virtual CPU 144 based on an allocation schedule for allocating the CPU 103 to the virtual CPUs 143 and 144. The allocation schedule is stored in the VM scheduler 141. When the interrupt controller 106 issues the interrupt request, the VM scheduler 141 determines allocation of the CPU 103 or the tick CPU 105 to the virtual CPU 143 or 144, so that processing attributed to the interrupt request can be preferentially performed. That is to say, the VM scheduler 141 properly determines allocation of the CPU 103 or the tick CPU 105 to the virtual CPU 143 or 144 based on (i) the allocation schedule stored therein and (ii) information notified by the interrupt processing unit 140, namely, the type of the interrupt request and the virtual machine 110 or 111 to be interrupted. The VM scheduler 141 also determines the CPU (CPU 103 or tick CPU 105) to be allocated to the virtual CPU 143 or 144 based on the type of the interrupt request and the virtual machine 110 or 111 to be interrupted, which are identified by the interrupt processing unit 140. The VM scheduler 141 further has a function of judging whether or not the virtual CPU 143 or 144 is performing computer processing of the virtual machine 110 or 111 other than the timer processing. The VM scheduler 141 reflects the result of this judgment in allocating of the CPU 103 or the tick CPU 105 to the virtual CPU 143 or 144.

The VM scheduler 141 instructs the CPU management unit 142 to allocate the CPU 103 or the tick CPU 105 to the virtual CPU 143 or 144 in accordance with the above determination.

The CPU management unit 142 allocates the CPU 103 or the tick CPU 105 to the virtual CPU 143 or 144 in accordance with the above determination notified by the VM scheduler 141. The CPU management unit 142 also manages pieces of data that are used when the virtual CPUs 143 and 144 respectively execute the virtual machines 110 and 111.

By way of example, assume that the CPU management unit 142 causes the virtual CPU 143 to perform computer processing of the virtual machine 110 other than the timer processing while the virtual CPU 144 is performing computer processing of the virtual machine 111 other than the timer processing.

Figure 3A:
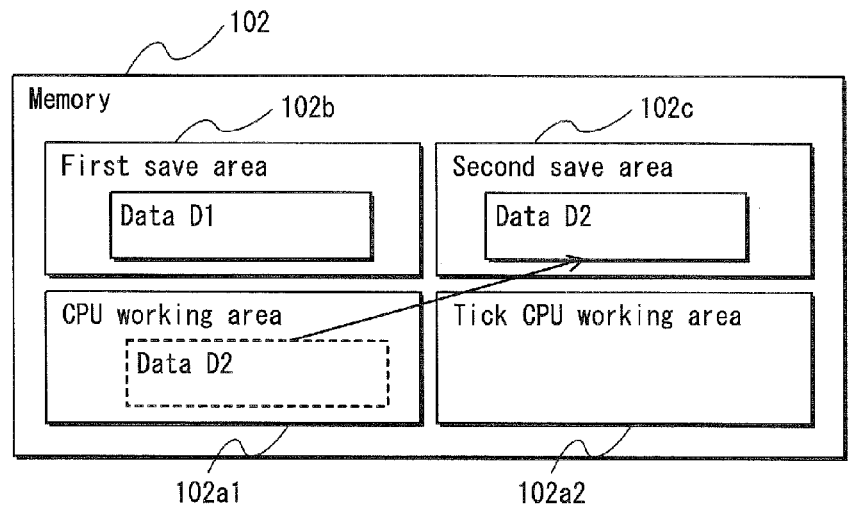
FIGS. 3A and 3B illustrate the operations of the computer system pertaining to Embodiment 1.

In this case, the CPU management unit 142 allocates the CPU 103 to the virtual CPU 143. At this time, the CPU management unit 142 temporarily moves the data D2 from the CPU working area 102a1 to the second save area 102c in the memory 102 (FIG. 3A).

Figure 3B:
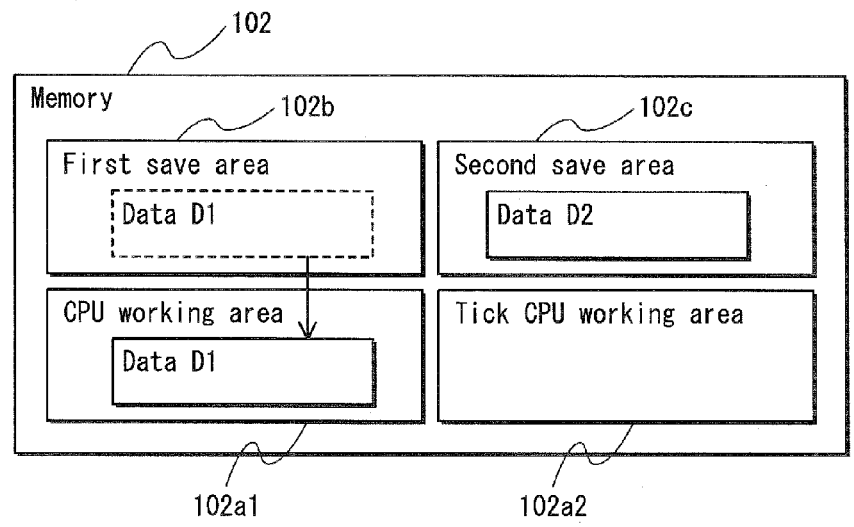

Thereafter, the CPU management unit 142 loads the data D1, which has been saved in the first save area 102b in advance, to the CPU working area 102a1 (FIG. 3B).

By way of example, assume that the CPU management unit 142 causes the virtual CPU 143 to perform the timer processing of the virtual machine 110 while the virtual CPU 144 is performing computer processing of the virtual machine 111 other than the timer processing.

Figure 4A:
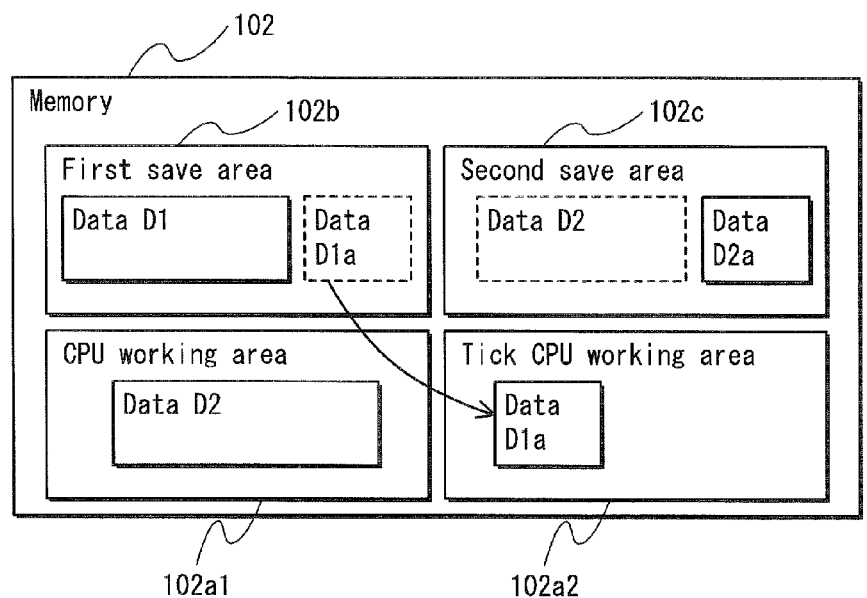
FIGS. 4A and 4B illustrate the operations of the computer system pertaining to Embodiment 1.
Figure 4B:
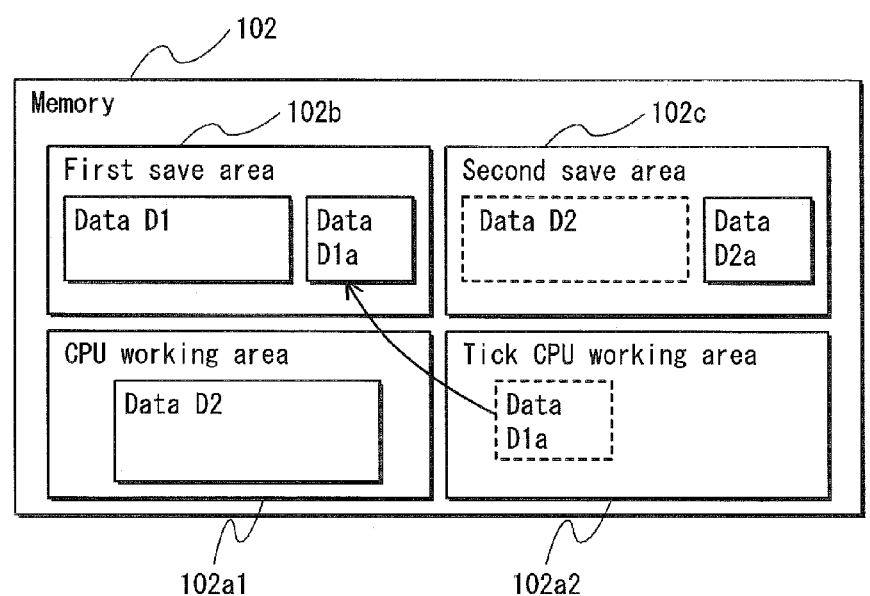

In this case, the CPU management unit 142 leaves the allocation of the CPU 103 to the virtual CPU 144 unchanged, and allocates the tick CPU 105 to the virtual CPU 143. At this time, the CPU management unit 142 loads the data D1a, which has been saved in the first save area 102b in advance, to the tick CPU working area 102a2 as shown in FIG. 4A. Once the virtual CPU 143 completes the timer processing of the virtual machine 110, the CPU management unit 142 moves the data D1a from the tick CPU working area 102a2 to the first save area 102b again (FIG. 4B). When allocating the tick CPU 105 to the virtual CPU 144, the CPU management unit 142 loads the data D2a, which has been saved in the second save area 102c in advance, to the tick CPU working area 102a2.

<1-3> Virtual Machines

The virtual machines 110 and 111 are respectively managed by the operating systems OS1 and OS2. In the example shown in FIG. 1, application tasks T11 and T12 are executed on the operating system OS1 of the virtual machine 110, whereas application tasks T21 and T22 are executed on the operating system OS2 of the virtual machine 111. Note that FIG. 1 conceptually illustrates the virtual machines 110 and 111 being enabled by the CPU 103 executing a program stored in the memory 102. The virtual machines 110 and 111 are not the actual constituent elements of the memory 102.

The operating systems OS1 and OS2 respectively manage interrupt tables Tb1 and Tb2. The interrupt tables Tb1 and Tb2 contain (i) the type of the interrupt request notified by the interrupt controller 106 and (ii) entry addresses of interrupt handlers each corresponding to a different one of interrupt requests. Here, the interrupt tables Tb1 and Tb2 are referred to by the virtual CPUs 143 and 144 when executing a handler. The virtual CPUs 143 and 144 refer to the interrupt tables Tb1 and Tb2, identify an entry address based on the notified type of the interrupt request, and execute a handler identified by this entry address.

Some of the entry addresses registered with the interrupt tables Tb1 and Tb2 identify interrupt handlers (tick handlers) for performing the timer processing. When the virtual CPUs 143 and 144 execute a tick handler, the values counted by the system timers ST1 and ST2 are incremented by one (i.e., the internal times of the system timers ST1 and ST2 are advanced by one unit).

When the interrupt controller 106 issues a tick interrupt request, the virtual CPUs 143 and 144 refer to the interrupt tables Tb1 and Tb2 in order to identify an entry address corresponding to a tick handler.

<2> Operations

Figure 5:
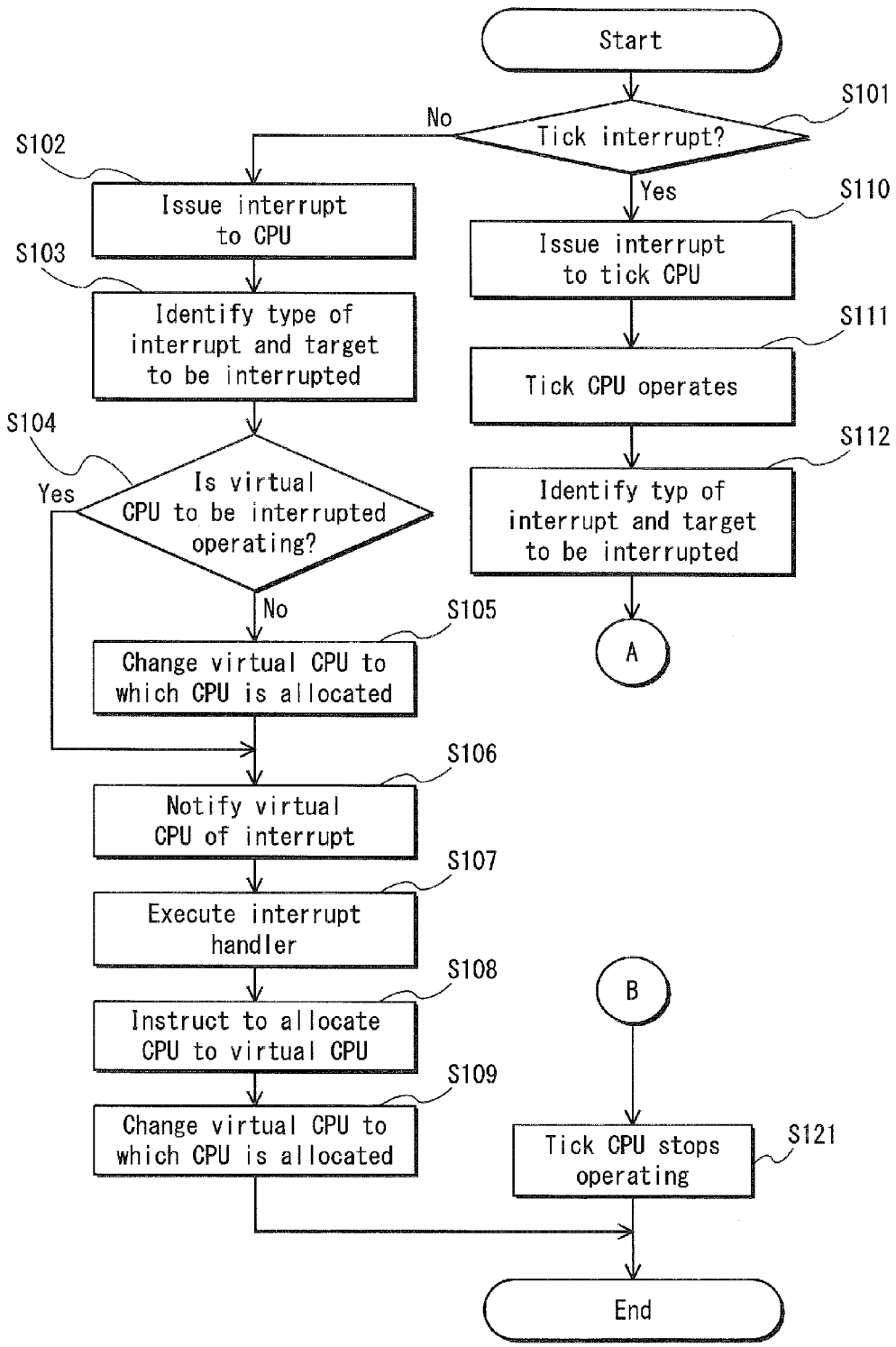
FIG. 5 is a flowchart of the operations of the computer system pertaining to Embodiment 1.
Figure 6:
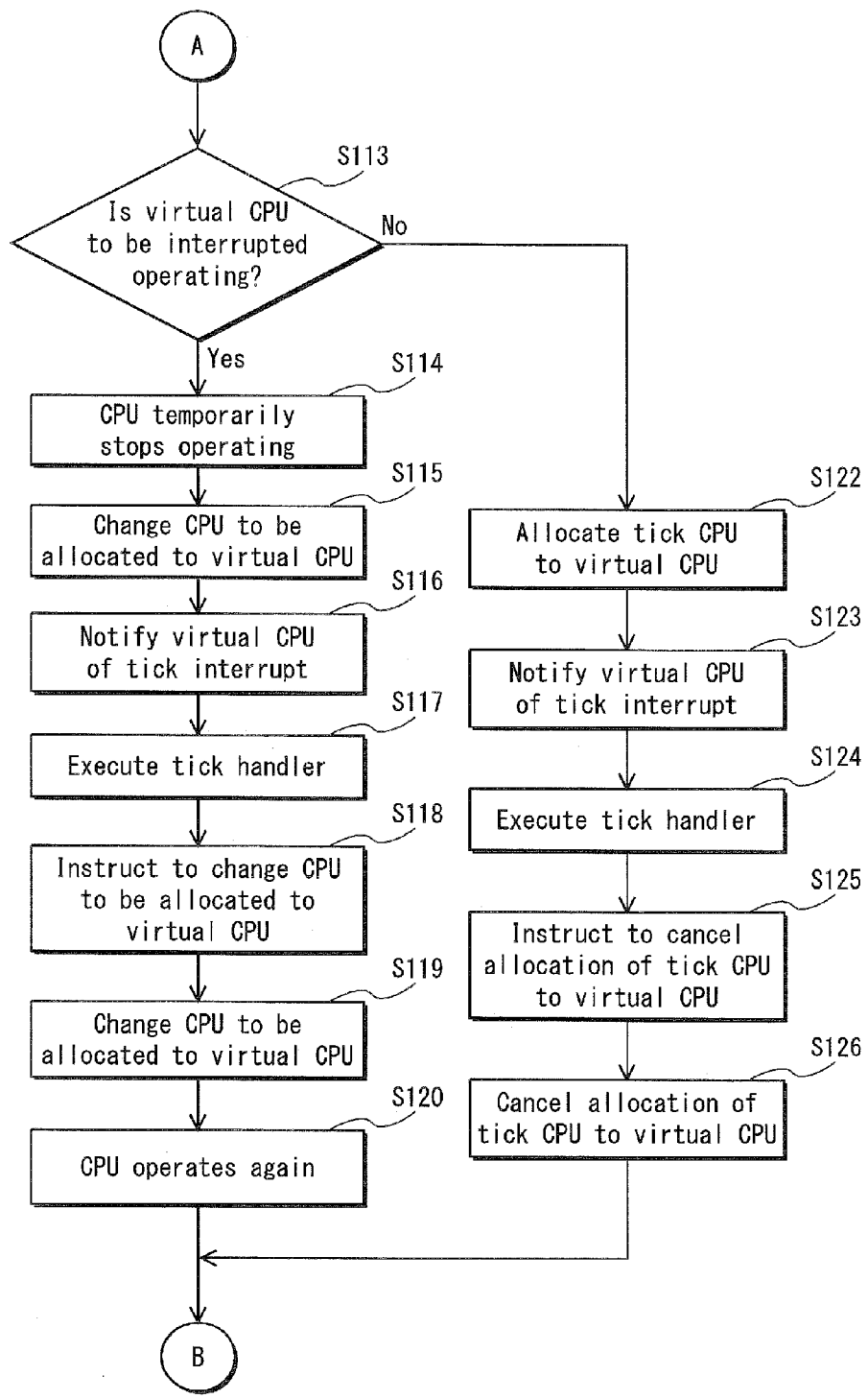
FIG. 6 is a flowchart of the operations of the computer system pertaining to Embodiment 1.

FIGS. 5 and 6 are flowcharts of the operations of the computer system pertaining to the present embodiment.

First, when the hardware timer 107 inputs an interrupt request signal to the interrupt controller 106, the interrupt controller 106 judges whether or not this interrupt request signal is a tick interrupt (step S101). At this time, the interrupt controller 106 judges the type of the interrupt request signal depending on the terminal to which the interrupt request signal has been input, namely, one of the first signal input terminal and the second signal input terminal. For example, when the interrupt request signal has been input to the second signal input terminal, the interrupt controller 106 judges the interrupt request signal as a tick interrupt.

When the interrupt controller 106 judges in step S101 that the interrupt request signal does not request a tick interrupt (the "No" branch of step S101), the interrupt controller 106 issues an interrupt request to the CPU 103 via the interrupt signal line 108b1 (step S102). At this time, the interrupt processing unit 140 (i) accesses the interrupt request information stored in the interrupt controller 106, (ii) identifies the type of the interrupt request and the target to be interrupted (assumed here as the virtual CPU 143), and (iii) notifies the identified type of the interrupt request, as well as the identified target to be interrupted, to the VM scheduler 141 (step S103). In this case, the interrupt processing unit 140 notifies, to the VM scheduler 141, that the interrupt request is other than the tick interrupt and the target to be interrupted is the virtual CPU 143.

Next, the VM scheduler 141 judges whether or not the virtual CPU 143 is currently performing computer processing of the virtual machine 110 other than the timer processing (equivalent to the first processing)—i.e., whether or not the virtual CPU 143 to be interrupted is operating (step S104). The VM scheduler 141 subsequently notifies the result of the judgment to the CPU management unit 142.

Figure 7A:
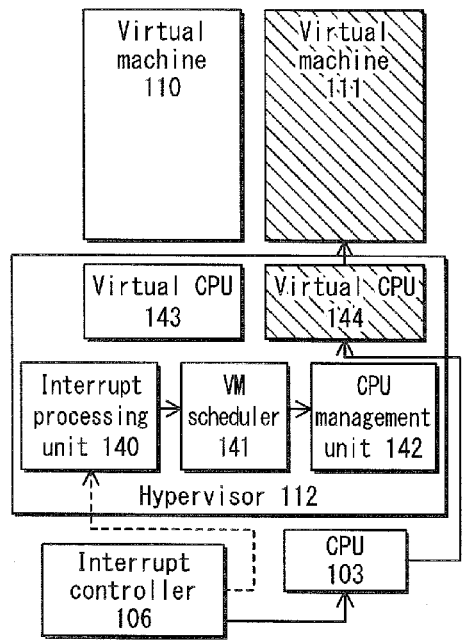
FIGS. 7A to 7D illustrate the operations of the computer system pertaining to Embodiment 1.
Figure 7C:
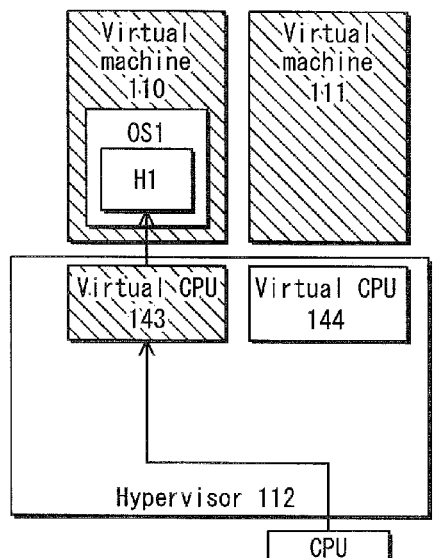
Figure 7B:
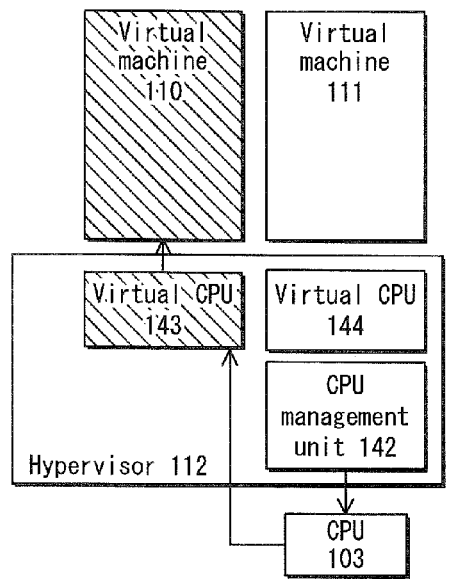

When the VM scheduler 141 judges in step S104 that the virtual CPU 143 is not operating (the "No" branch of step S104) (FIG. 7A), the CPU management unit 142 causes the virtual CPU 144 to stop computer processing of the virtual machine 111 other than the timer processing, and cancels allocation of the CPU 103 to the virtual CPU 144. Thereafter, the CPU management unit 142 allocates the CPU 103 to the virtual CPU 143 (i.e., switches the target to which the CPU 103 is allocated from the virtual CPU 144 to the virtual CPU 143) (FIG. 7B) (step S105). At this time, the CPU management unit 142 moves the data D2 from the CPU work area 102a1 of the memory 102 to the second save area 102c of the memory 102 (see FIG. 3A). The CPU management unit 142 also loads the data D1, which has been saved in the first save area 102b in advance, to the CPU working area 102a1 (see FIG. 3B).

Figure 7D:
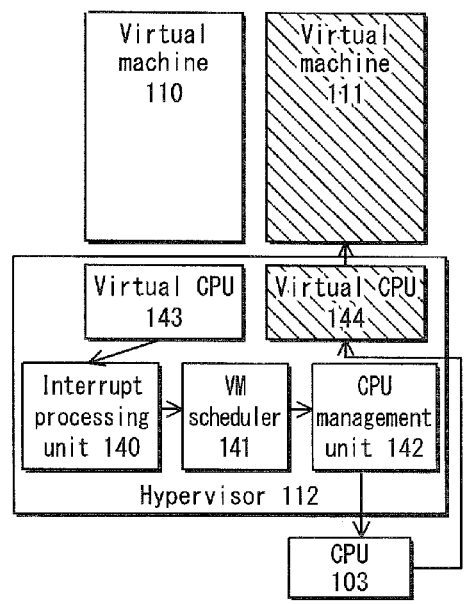

Thereafter, the interrupt processing unit 140 notifies the virtual CPU 143 that the interrupt controller 106 has issued an interrupt request other than the tick interrupt (step S106). Upon being notified of the interrupt request, the virtual CPU 143 executes an interrupt handler H1 in accordance with an entry address registered with the interrupt table Tb1 (FIG. 7C) (step S107). When the virtual CPU 143 completes execution of the interrupt handler H1, the interrupt processing unit 140 notifies the VM scheduler 141 that execution of the interrupt handler H1 is completed. Upon being notified that execution of the interrupt handler H1 is completed, the VM scheduler 141 instructs the CPU management unit 142 to allocate the CPU 103 to the virtual CPU 143 (step S108). Then, the CPU management unit 142 cancels allocation of the CPU 103 to the virtual CPU 143, and allocates the CPU 103 to the virtual CPU 144 (i.e., switches the target to which the CPU 103 is allocated from the virtual CPU 143 to the virtual CPU 144) (FIG. 7D) (step S109).

Figure 8A:
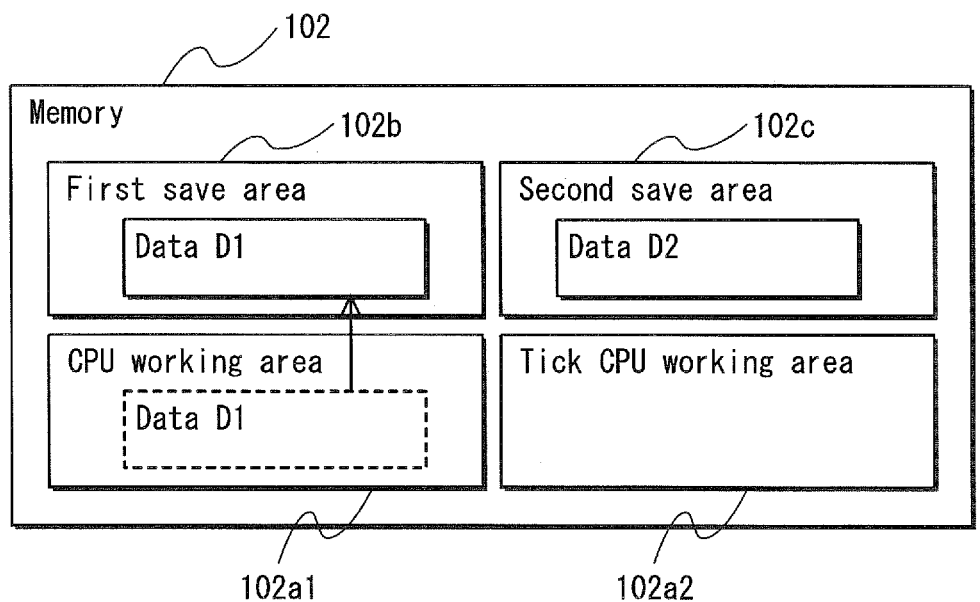
FIGS. 8A and 8B illustrate the operations of the computer system pertaining to Embodiment 1.
Figure 8B:
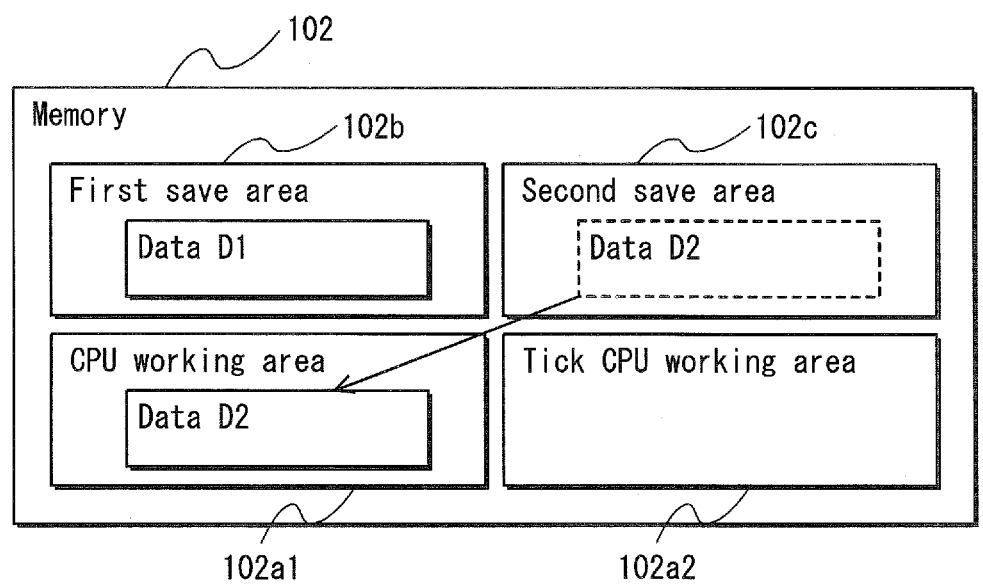

At this time, the CPU management unit 142 moves the data D1 from the CPU working area 102a1 of the memory 102 to the first save area 102b of the memory 102, as shown in FIG. 8A. The CPU management unit 142 also loads the data D2, which has been saved in the second save area 102b, to the CPU working area 102a1, as shown in FIG. 8B.

On the other hand, when the interrupt controller 106 judges in step S101 that the interrupt request signal does request the tick interrupt (the "Yes" branch of step S101), the interrupt controller 106 issues an interrupt request to the tick CPU 105 via the interrupt signal line 108b2 (step S110). Upon receiving the interrupt request, the tick CPU 105 starts operating (step S111). The interrupt processing unit 140 (i) accesses the interrupt request information stored in the interrupt controller 106, (ii) identifies the type of the interrupt request and the target to be interrupted (virtual CPU 143), and (iii) notifies the identified type of the interrupt request, as well as the identified target to be interrupted, to the VM scheduler 141 (step S112). It is assumed here that the tick CPU 105 has received a tick interrupt for causing the virtual CPU 143 to perform the timer processing of the virtual machine 110. In this case, the interrupt processing unit 140 notifies, to the VM scheduler 141, that the interrupt request is a tick interrupt and the target to be interrupted is the virtual machine 110.

Next, the VM scheduler 141 judges whether or not the virtual CPU 143 is currently performing computer processing of the virtual machine 110 other than the timer processing—i.e., whether or not the virtual CPU 143 to be interrupted is operating (step S113). The VM scheduler 141 subsequently notifies the result of the judgment to the CPU management unit 142.

Figure 9A:
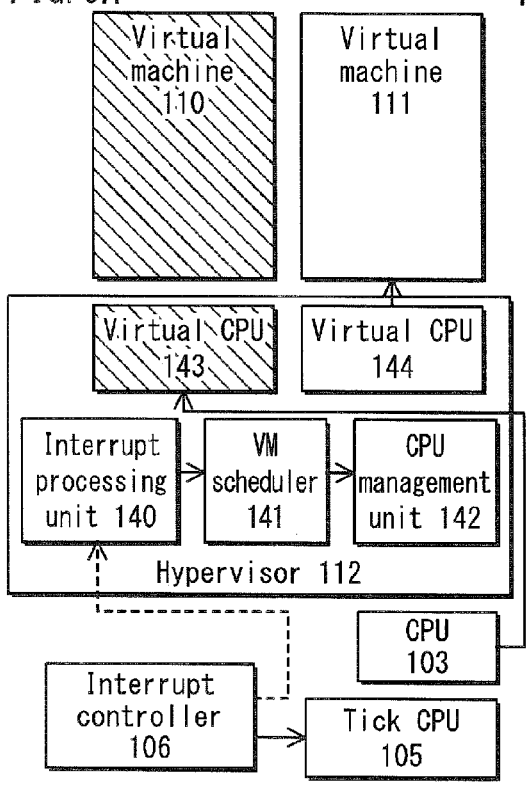
FIGS. 9A to 9D illustrate the operations of the computer system pertaining to Embodiment 1.
Figure 9C:
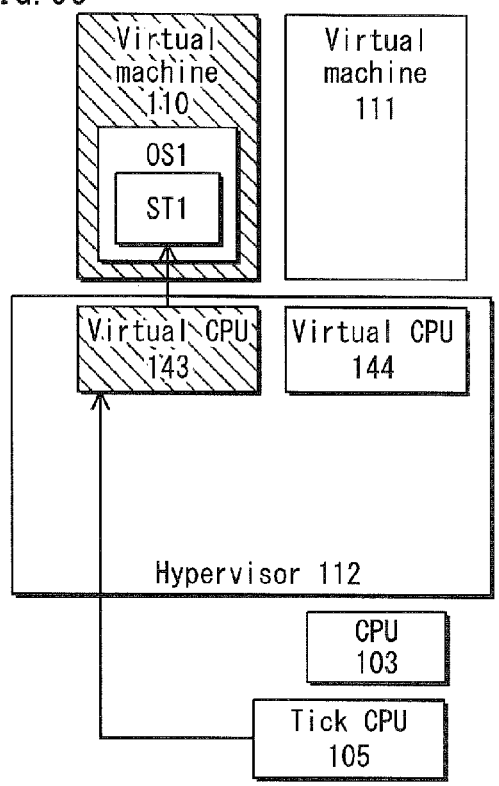
Figure 9B:
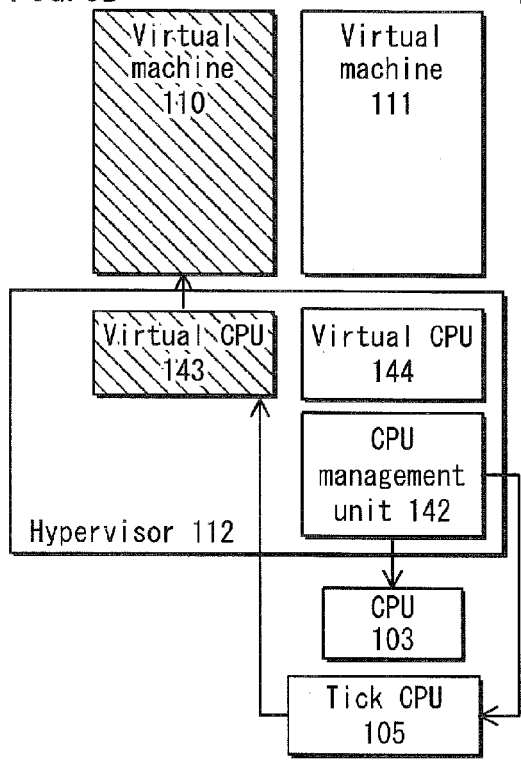
Figure 10A:
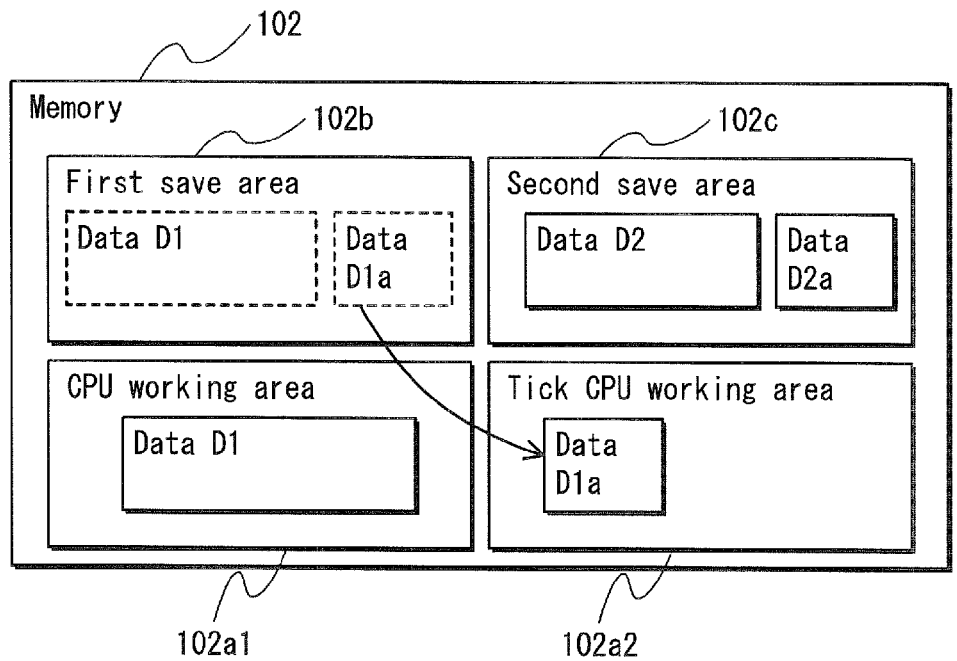
FIGS. 10A and 10B illustrate the operations of the computer system pertaining to Embodiment 1.

When it is judged in step S113 that the virtual CPU 143 is operating (FIG. 9A) (the "Yes" branch of step S113), the CPU management unit 142 temporarily stops the CPU 103 that is currently allocated to the virtual CPU 143 (step S114). Then, upon confirming that the CPU 103 has been stopped, the CPU management unit 142 cancels allocation of the CPU 103 to the virtual CPU 143, and allocates the tick CPU 105 to the virtual CPU 143 (i.e., switches between CPUs to be allocated to the virtual CPU) (FIG. 9B) (step S115). At this time, as shown in FIG. 10A, the CPU management unit 142 leaves the data D1 stored in the CPU working area 102a1 of the memory 102 as-is, and loads the data D1a, which has been saved in the first save area 102b in advance, to the tick CPU working area 102a2.

Thereafter, the interrupt processing unit 140 notifies the virtual CPU 143 that the interrupt controller 106 has issued a tick interrupt (step S116). Upon being notified of the interrupt request, the virtual CPU 143 executes a tick handler in accordance with an entry address registered with the interrupt table Tb1 (FIG. 9C) (step S117). When the virtual CPU 143 completes execution of the tick handler, the interrupt processing unit 140 notifies the VM scheduler 141 that execution of the tick handler is completed.

Figure 10B:
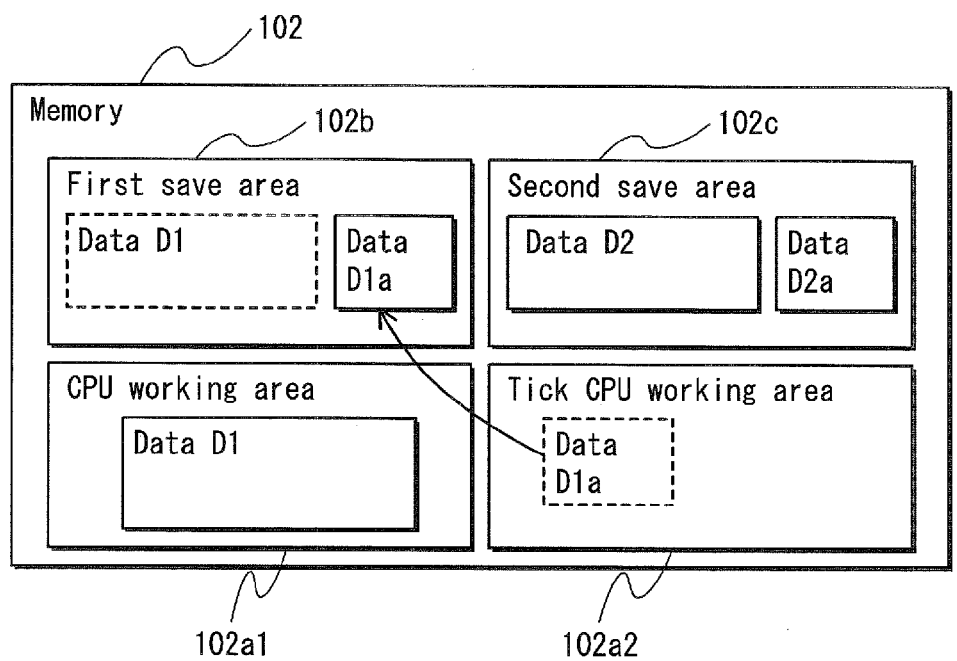

Upon being notified that execution of the tick handler is completed, the VM scheduler 141 instructs the CPU management unit 142 to cancel allocation of the tick CPU 105 to the virtual CPU 143 and allocate the CPU 103 to the virtual CPU 143 (i.e., switch between CPUs to be allocated to the virtual CPU 143) (step S118). Thereafter, the CPU management unit 142 allocates the CPU 103 to the virtual CPU 143 (step S119). At this time, as shown in FIG. 10B, the CPU management unit 142 moves the data D1a in the memory 102 from the tick CPU working area 102a2 to the first save area 102b.

Figure 9D:
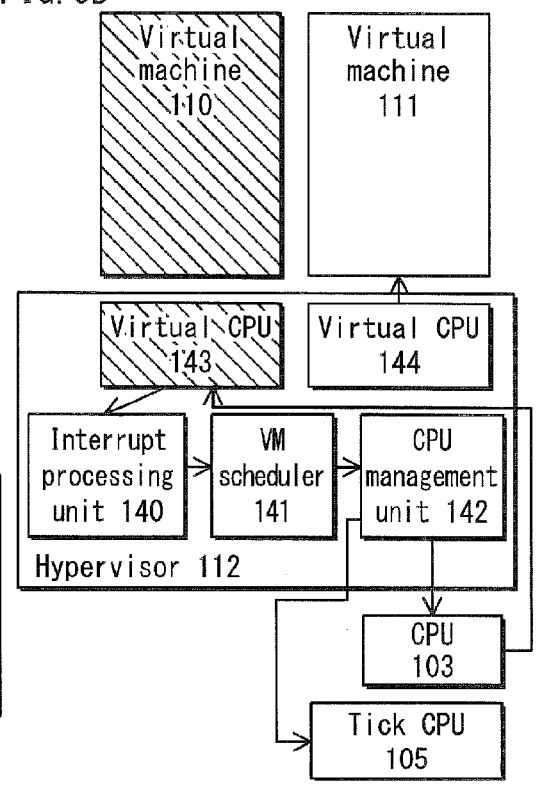

Thereafter, the CPU 103 leaves the temporarily-stopped state and starts operating (FIG. 9D) (step S120). Subsequently, the tick CPU 105 stops operating (step S121).

Figure 12A:
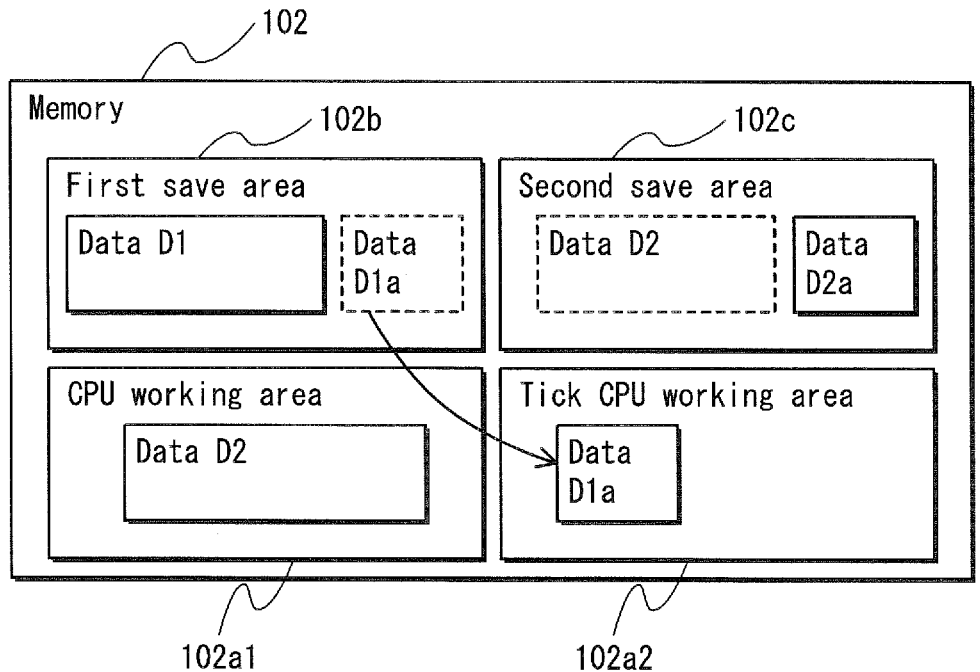
FIGS. 12A and 12B illustrate the operations of the computer system pertaining to Embodiment 1.
Figure 12B:
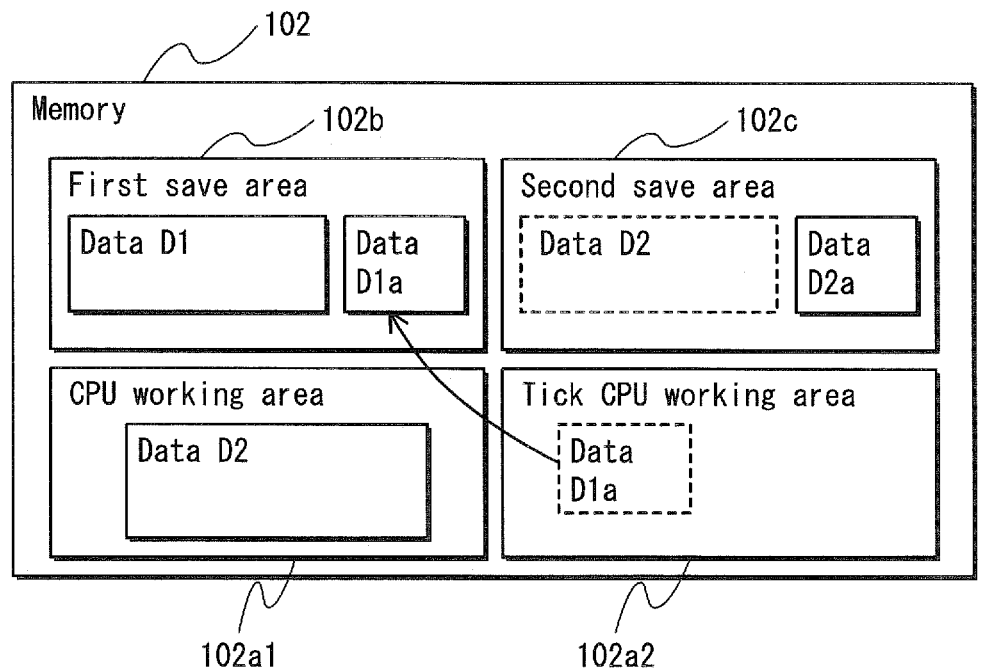

On the other hand, when it is judged in step S113 that the virtual CPU 143 is not operating (FIG. 11A) (the "No" branch of step S113), the CPU management unit 142 allocates the tick CPU 105 to the virtual CPU 143 (FIG. 11B) (step S122). At this time, if the CPU 103 is allocated to the virtual CPU 144, the CPU 103 remains to be allocated to the virtual CPU 144. Here, as shown in FIG. 12A, the CPU management unit 142 leaves the data D2 stored in the CPU working area 102a1 of the memory 102 as-is, and loads the data D1a, which has been saved in the first save area 102b in advance, to the tick CPU working area 102a2.

Thereafter, the interrupt processing unit 140 notifies the virtual CPU 143 that the interrupt controller 105 has issued a tick interrupt (step S123). Upon being notified of the interrupt request, the virtual CPU 143 executes a tick handler in accordance with an entry address registered with the interrupt table Tb1, and advances the value counted by the system timer ST1 (FIG. 9C) (step S124). When the virtual CPU 143 completes execution of the tick handler, the interrupt processing unit 140 notifies the VM scheduler 141 that execution of the tick handler is completed. Upon being notified that execution of the tick handler is completed, the VM scheduler 141 instructs the CPU management unit 142 to cancel allocation of the tick CPU 105 to the virtual CPU 143 (step S125). Subsequently, the CPU management unit 142 cancels allocation of the tick CPU 105 to the virtual CPU 143 (FIG. 9D) (step S126).

Once the allocation of the tick CPU 105 to the virtual CPU 143 is cancelled, the tick CPU 105 stops operating (step S121).

In the present embodiment, the memory 102 includes the CPU working area 102a1 and the tick CPU working area 102a2 separately. Accordingly, in the present embodiment, there is no need to relocate data from the CPU working area 102a1 when allocating the tick CPU 105 to the virtual CPU 243 or 244 to perform the timer processing. This can reduce the overhead associated with data relocation, and therefore can suppress a decrease in the processing efficiency of the computer system. Furthermore, because the virtual CPU 143 or 144 to which the tick CPU 105 is allocated performs the timer processing in real-time compliance with the tick interrupt issued by the interrupt controller 106, it is possible to maintain the real-time status of the timer processing of the virtual machines 110 and 111.

Embodiment 2

<1> Structure

<1-1> Overall Structure

Figure 13:
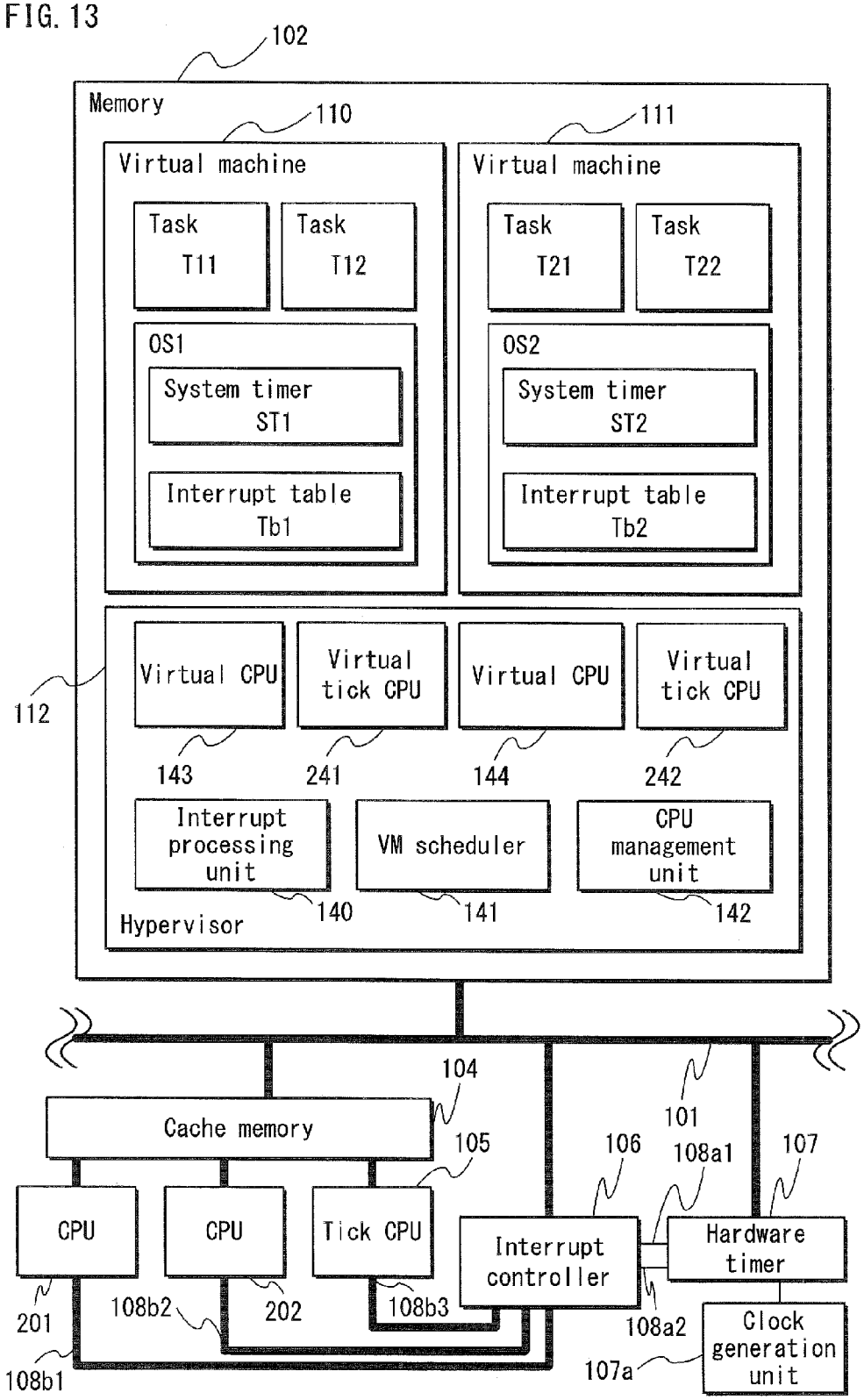
FIG. 13 shows an overall structure of a computer system pertaining to Embodiment 2.

FIG. 13 shows the structure of a computer system pertaining to the present embodiment.

The structure of the computer system 100 pertaining to the present embodiment is substantially the same as that of the computer system 100 pertaining to Embodiment 1. The present embodiment differs from Embodiment 1 in that the computer system 100 includes two CPUs 201 and 202, and in the areas (storage areas) allocated in the memory 102. Note that the structural elements that are the same as in Embodiment 1 have the same reference numbers thereas, and are omitted from the following description.

The CPUs 201 and 202 are configured with processors that have the same operational clock frequency, consume the same amount of power, exert the same computing performances, and have the same instruction set architecture.

Figure 14A:
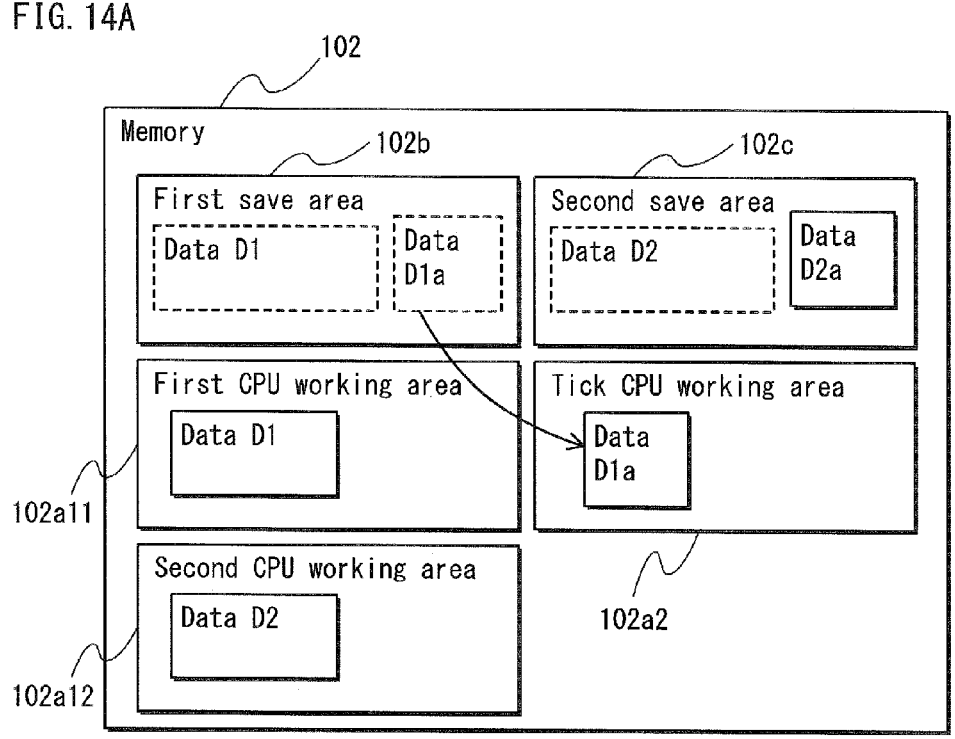
FIGS. 14A and 14B illustrate the operations of the computer system pertaining to Embodiment 2.
Figure 14B:
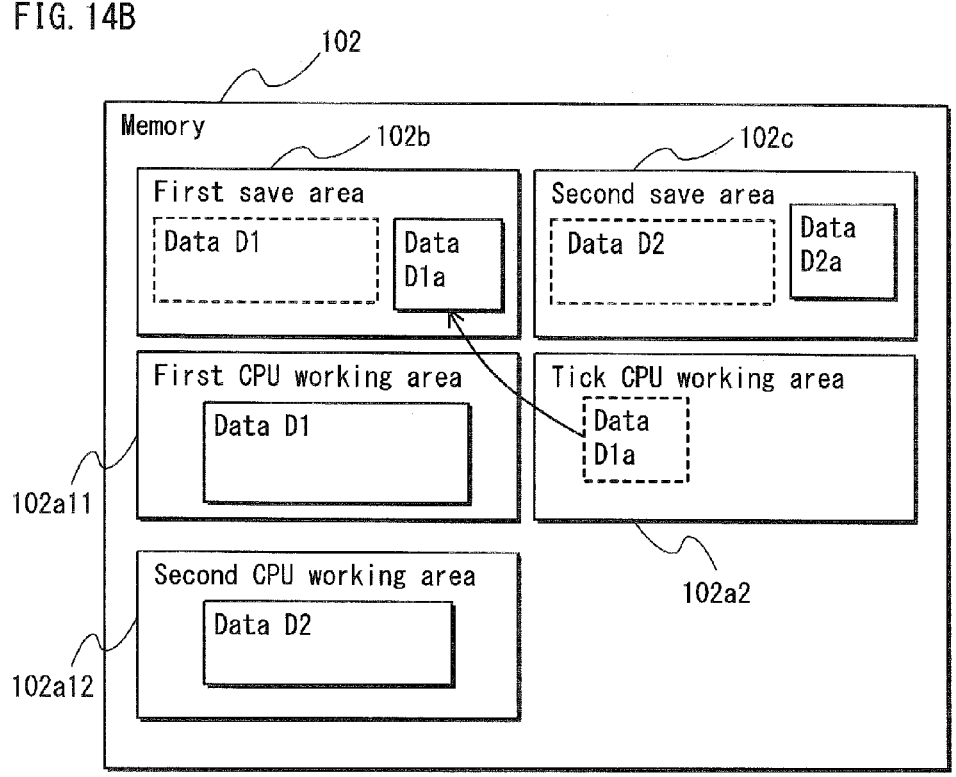

As shown in FIGS. 14A and 14B, the memory 102 includes a first CPU working area 102a11, a second CPU working area 102a12, a tick CPU working area 102a2, a first save area 102b, and a second save area 102c. The first CPU working area 102a11 stores therein data D1 including, for example, register information for allocating the CPU 201 to the virtual CPU 143. The second CPU working area 102a12 stores therein data D2 including, for example, register information for allocating the CPU 202 to the virtual CPU 144. The tick CPU working area 102a2 stores therein pieces of data D1a and D2a that each include, for example, register information for allocating the tick CPU 105 to the virtual tick CPU 241 or 242 (described later). The first save area 102b and the second save area 102c are the areas where the pieces of data D1, D2, D1a and D2a are temporarily saved.

That is to say, the data D1 is required to allocate the CPU 201 to the virtual CPU 143 so as to cause the virtual CPU 143 to perform computer processing of the virtual machine 110 other than the timer processing, whereas the data D2 is required to allocate the CPU 103 to the virtual CPU 144 so as to cause the virtual CPU 144 to perform computer processing of the virtual machine 111 other than the timer processing. The data D1a is required to allocate the tick CPU 105 to the virtual tick CPU 241 so as to cause the virtual tick CPU 241 to perform the timer processing of the virtual machine 110, whereas the data D2a is required to allocate the tick CPU 105 to the virtual tick CPU 242 so as to cause the virtual tick CPU 242 to perform the timer processing of the virtual machine 111.

<1-2> Hypervisor

As shown in FIG. 13, the hypervisor 112 is composed of virtual CPUs 143 and 144, virtual tick CPUs 241 and 242, an interrupt processing unit 140, a virtual machine (VM) scheduler 141, and a CPU management unit 142. Note that the structural elements that are the same as in Embodiment 1 are partially omitted from the following description. Also note that FIG. 13 conceptually illustrates the hypervisor 112 being enabled by the CPUs 201 and 202 executing a program stored in the memory 102. The hypervisor 112 is not an actual constituent element of the memory 102.

The virtual CPUs 143 and 144 are enabled by the CPUs 201 and 202.

The virtual tick CPUs 241 and 242 are enabled by the tick CPU 105. Each of the virtual tick CPUs 241 and 242 is appended with operating system information showing whether or not the operating system OS1 or OS2 for managing the corresponding virtual machine 110 or 111 is compatible with SMP, which will be described later. The virtual tick CPUs 241 and 242 are equivalent to the third virtual processing unit.

The virtual CPU 143 performs computer processing of the virtual machine 110 other than the timer processing (equivalent to the first processing), and the virtual tick CPU 241 performs the timer processing of the virtual machine 110 (equivalent to the second processing).

The virtual CPU 144 performs computer processing of the virtual machine 111 other than the timer processing, and the virtual tick CPU 242 performs the timer processing of the virtual machine 111.

When the interrupt controller 106 issues an interrupt request to the CPU 201, the CPU 202 or the tick CPU 105, the interrupt processing unit 140 identifies the type of the interrupt request and the target to be interrupted (i.e., the virtual machine 110 or 111), and notifies the identified type of the interrupt request, as well as the identified target to be interrupted, to the VM scheduler 141. At this time, the interrupt processing unit 140 accesses the interrupt request information stored in the interrupt controller 106 in order to identify the type of the interrupt request and the target to be interrupted.

The VM scheduler 141 manages an allocation time schedule according to which the CPUs 201 and 202 and the tick CPU 105 are allocated to the virtual CPUs 143 and 144 and the virtual tick CPUs 241 and 242, which execute the virtual machines 110 and 111. The VM scheduler 141 also determines the CPU (CPU 201, CPU 202 or tick CPU 105) to be allocated to the virtual CPU 143, the virtual CPU 144, the virtual tick CPU 241 or the virtual tick CPU 242, based on the type of the interrupt request and the target to be interrupted (virtual machine 110 or 111), which are identified by the interrupt processing unit 140.

Normally, the VM scheduler 141 causes the virtual CPUs 143 and 144 to execute the virtual machines 110 and 111, respectively, based on the allocation time schedule stored therein, the allocation time schedule indicating allocation of the CPUs 201 and 202 to the virtual CPUs 143 and 144. In the present embodiment, the VM scheduler 141 allocates the CPU 201 to the virtual CPU 143 and the CPU 202 to the virtual CPU 144. This allocation of the CPUs 201 and 202 to the virtual CPUs 143 and 144 is not changed. When the interrupt controller 106 issues an interrupt request, the VM scheduler 141 determines allocation of the tick CPU 105 to the virtual CPU 241 or 242.

The CPU management unit 142 allocates the CPUs 201 and 202 to the virtual CPUs 143 and 144, and allocates the tick CPU 105 to the virtual tick CPU 241 or 242, in accordance with the allocation time schedule determined by the VM scheduler 141, the allocation time schedule showing the allocation of the CPUs 201 and 202 to the virtual CPUs 143 and 144, as well as the allocation of the tick CPU 105 to the virtual tick CPU 241 or 242.

The CPU management unit 142 also manages pieces of data that are used by the virtual CPUs 143 and 144 and the virtual tick CPUs 241 and 242 when performing the computer processing of the virtual machine 110 or 111. For example, as shown in FIG. 14A, the CPU management unit 142 stores the data D1 in the first CPU working area 102a11 corresponding to the CPU 201, and the data D2 in the second CPU working area 102a12 corresponding to the CPU 202.

By way of example, assume that the CPU management unit 142 causes the virtual CPU 143 to perform the timer processing of the virtual machine 110 while the virtual CPU 143 is performing computer processing of the virtual machine 110 other than the timer processing and the virtual CPU 144 is performing computer processing of the virtual machine 111 other than the timer processing.

In this case, the CPU management unit 142 allocates the tick CPU 105 to the virtual tick CPU 241. Here, as shown in FIG. 14A, the CPU management unit 142 leaves the pieces of data D1 and D2 stored in the first CPU working area 102a11 and the second CPU working area 102a12, respectively, and loads the data D1a, which has been saved in the first save area 102b in advance, to the tick CPU working area 102a2. On the other hand, when allocating the tick CPU 105 to the virtual tick CPU 242, the CPU management unit 142 leaves the pieces of data D1 and D2 stored in the first CPU working area 102a11 and the second CPU working area 102a12, respectively, and loads the data D2a, which has been saved in the second save area 102c in advance, to the tick CPU working area 102a2.

<1-3> Virtual Machines

The virtual machines 110 and 111 are respectively managed by the operating systems OS1 and OS2. In the example shown in FIG. 13, application tasks T11 and T12 are performed on the operating system OS1 of the virtual machine 110, whereas application tasks T21 and T22 are performed on the operating system OS2 of the virtual machine 111. Note that the structural elements that are the same as in Embodiment 1 are partially omitted from the following description. Also note that FIG. 13 conceptually illustrates the virtual machines 110 and 111 being enabled by the CPUs 201 and 202 and the tick CPU 105 executing a corresponding program stored in the memory 102. The virtual machines 110 and 111 are not the actual constituent elements of the memory 102.

The operating systems OS1 and OS2 are compatible with symmetric multiprocessing (SMP). As with Embodiment 1, the operating systems OS1 and OS2 respectively manage interrupt tables Tb1 and Tb2. The interrupt tables Tb1 and Tb2 contain (i) the type of the interrupt request notified by the interrupt controller 106 and (ii) entry addresses for identifying interrupt handlers each corresponding to a different one of interrupt requests. The virtual CPUs 143 and 144 and the virtual tick CPUs 241 and 242 refer to the interrupt tables Tb1 and Tb2, identify an entry address based on the notified type of the interrupt request, and execute an interrupt handler corresponding to this entry address.

As with Embodiment 1, some of the entry addresses registered with the interrupt tables Tb1 and Tb2 identify tick handlers.

When the interrupt controller 106 issues a tick interrupt, the virtual tick CPU 241 or 242 to which the tick CPU 105 is allocated refers to the interrupt table Tb1 or Tb2 so as to identify an entry address corresponding to the tick handler. Then, the virtual tick CPU 241 or 242 to which the tick CPU 105 is allocated executes the tick handler and performs processing for updating the value counted by the system timer ST1 or ST2 (timer processing).

<2> Operations

Figure 15:
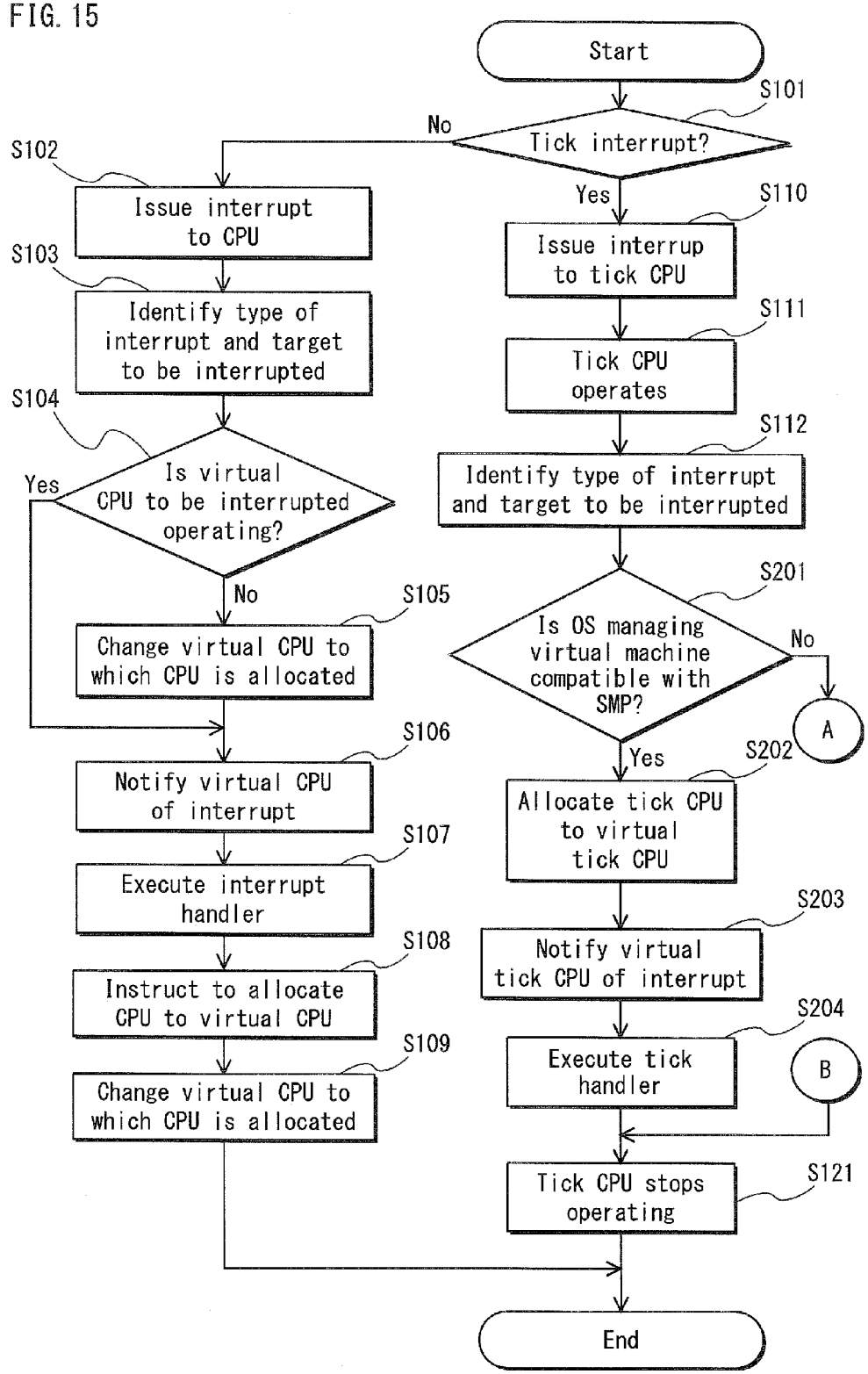
FIG. 15 is a flowchart of the operations of the computer system pertaining to Embodiment 2.

FIG. 15 is a flowchart of the operations of the computer system pertaining to the present embodiment.

First, when the hardware timer 107 inputs an interrupt request signal to the interrupt controller 106, the interrupt controller 106 judges whether or not this interrupt request signal requests a tick interrupt (step S101). At this time, the interrupt controller 106 judges the type of the interrupt request signal depending on the terminal to which the interrupt request signal has been input, namely, one of the first signal input terminal and the second signal input terminal. For example, when the interrupt request signal has been input to the second signal input terminal, the interrupt controller 106 judges the interrupt request signal as a tick interrupt.

When the interrupt controller 106 judges in step S101 that the interrupt request signal does not request the tick interrupt (the "No" branch of step S101), the interrupt controller 106 issues an interrupt request to the CPU 201 or 202 via the interrupt signal line 108 (step S102). The interrupt processing unit 140 identifies the type of the interrupt request and the target (virtual CPU) to be interrupted, and notifies the identified type of the interrupt request, as well as the identified target to be interrupted, to the VM scheduler 141 (step S103). The processing of steps S102 through S108 is the same as in Embodiment 1, and is omitted from the following description.

On the other hand, when the interrupt controller 106 judges in step S101 that the interrupt request signal does request the tick interrupt (the "Yes" branch of step S101), the interrupt controller 106 issues a tick interrupt to the tick CPU 105 via the interrupt signal line 108 (step S110). Upon receiving the tick interrupt, the tick CPU 105 starts operating (step S111). The interrupt processing unit 140 (i) accesses the interrupt request information stored in the interrupt controller 106, (ii) identifies the type of the interrupt request and the target (virtual CPU) to be interrupted, and (iii) notifies the identified type of the interrupt request, as well as the identified target to be interrupted, to the VM scheduler 141 (step S112). It is assumed here that the tick CPU 105 has received a tick interrupt for causing the virtual tick CPU 241 to perform the timer processing of the virtual machine 110. In this case, the interrupt processing unit 140 notifies, to the VM scheduler 141, that the interrupt request is a tick interrupt and the target to be interrupted is the virtual machine 110.

The interrupt processing unit 140 also judges whether or not the virtual machine 110 corresponding to the virtual tick CPU 241, for which the tick interrupt has been issued, is managed by the operating system OS1 compatible with SMP, based on operating system information appended to the virtual tick CPU 241 (step S201).

When the interrupt processing unit 140 judges in step S201 that the virtual machine 110 corresponding to the virtual tick CPU 241 is not managed by the operating system compatible with SMP (the "No" branch of step S201), the processing of step S113 onward explained in Embodiment 1 is performed.

Figure 16B:
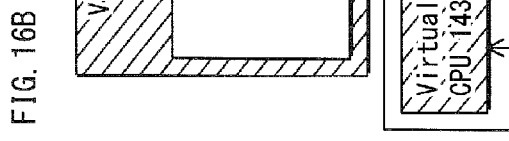
FIGS. 16A to 16C illustrate the operations of the computer system pertaining to Embodiment 2.
Figure 16A:
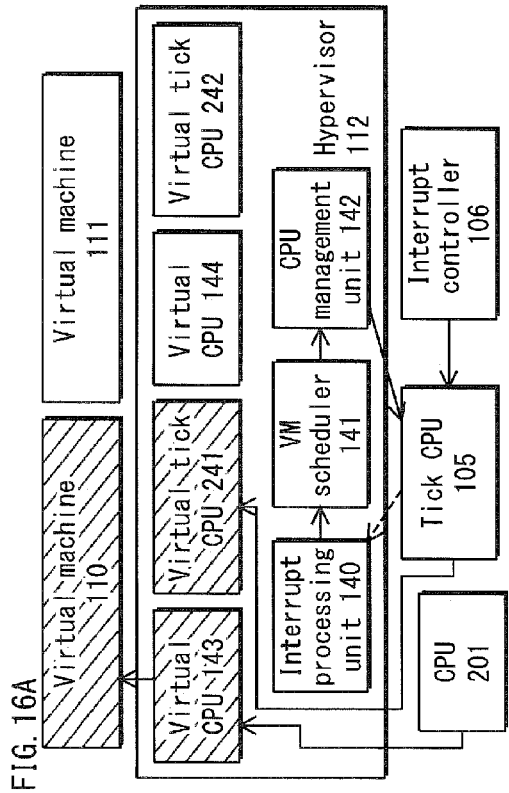
Figure 16C:
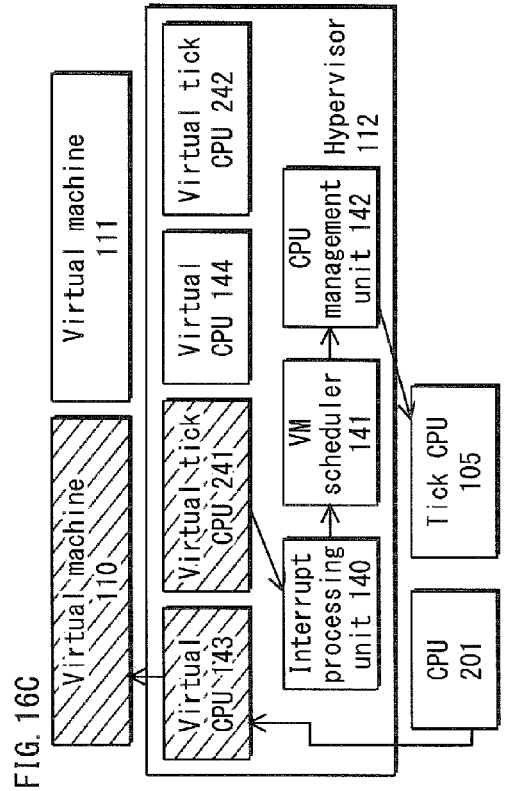
Figure 17:
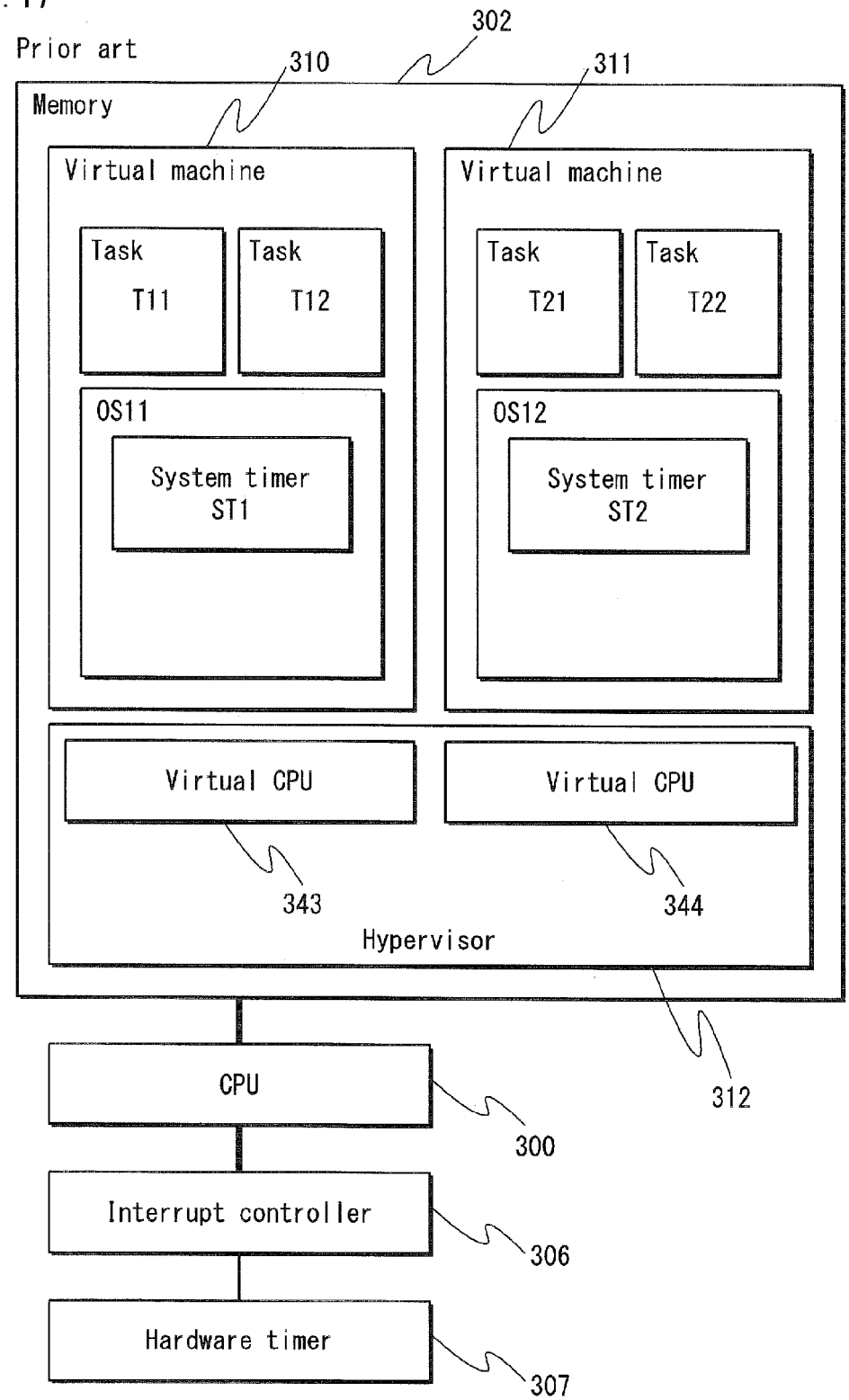
FIG. 17 shows an overall structure of a conventional computer system.
Figure 18:
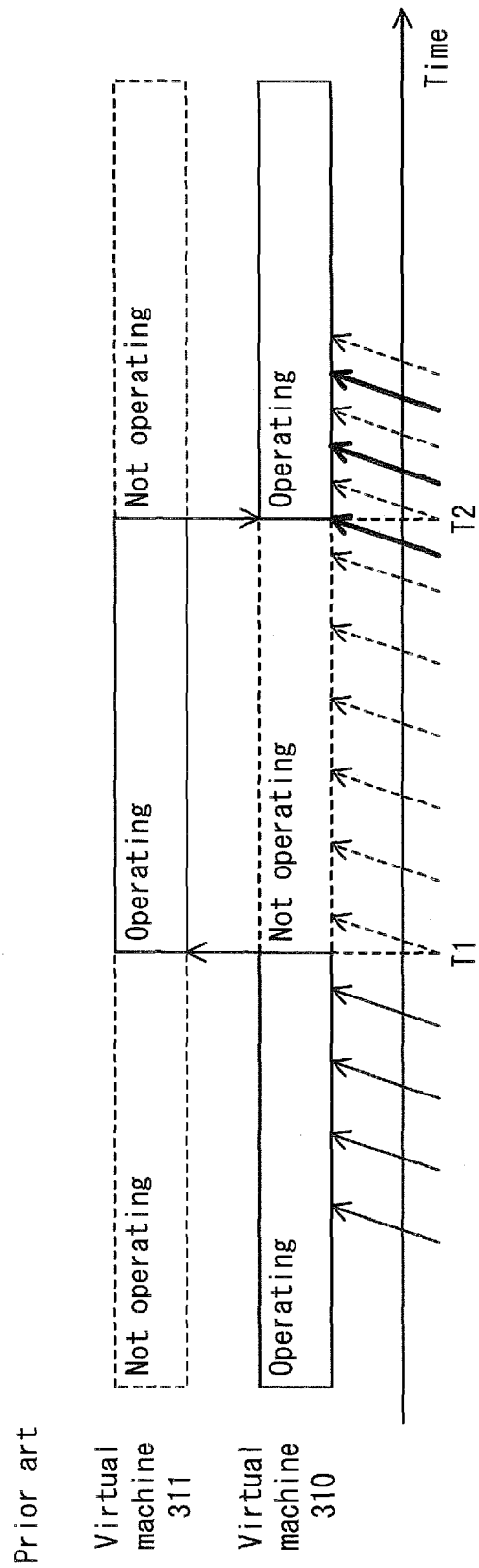
FIG. 18 illustrates the operations of a conventional computer system.
Figure 19:
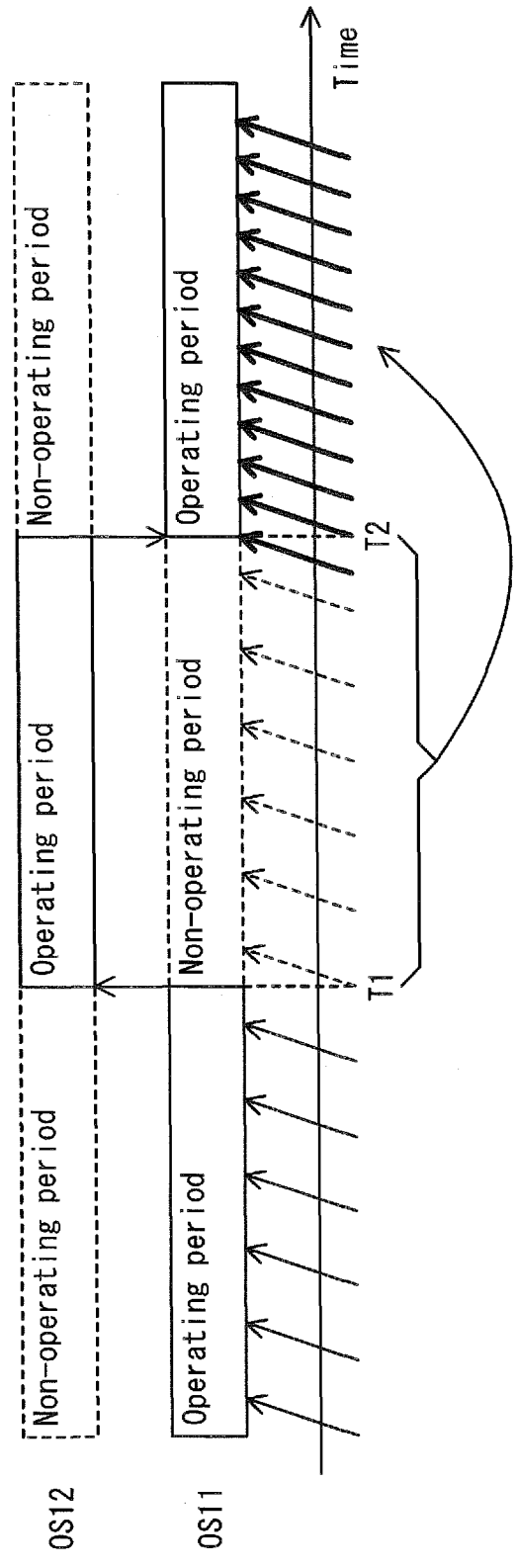
FIG. 19 illustrates the operations of a conventional computer system.

On the other hand, when the interrupt processing unit 140 judges in step S201 that the virtual machine 110 for which the tick interrupt is issued is managed by the operating system compatible with SMP (the "Yes" branch of step S201), the interrupt processing unit 140 allocates the tick CPU 105 to the virtual tick CPU 241 (step S202). At this time, as shown in FIG. 14A, the CPU management unit 142 leaves the pieces of data D1 and D2 stored in the first CPU working area 102a11 and the second CPU working area 102a12 of the memory 102, respectively, and loads the data D1a, which has been saved in the first save area 102b in advance, to the tick CPU working area 102a2. Thereafter, the interrupt processing unit 140 notifies the virtual tick CPU 241 that the interrupt controller 106 has issued a tick interrupt (FIG. 16A) (step S203). Upon being notified of the tick interrupt, the virtual tick CPU 241 executes a tick handler in accordance with an entry address registered with the interrupt table Tb1, and updates the system timer ST1 (FIG. 16B) (step S204). Once the execution of the tick handler is completed, the tick CPU 105 stops operating (FIG. 16C) (step S121).

In the present embodiment, the memory 102 includes the CPU working areas 102a11 and 102a12 and the tick CPU working area 102a2 separately. Accordingly, in the present embodiment, there is no need to relocate the pieces of data D1 and D2 from the CPU working areas 102a11 and 102a12, respectively, when allocating the tick CPU 105 to the virtual tick CPU 241 or 242 to perform the timer processing. This can reduce the overhead associated with data relocation, and therefore can suppress a decrease in the processing efficiency of the computer system. Furthermore, in the present embodiment, the virtual tick CPU 241 can perform the timer processing of the virtual machine 110 while the virtual CPU 143 is concurrently performing computer processing of the virtual machine 110 other than the timer processing. The present embodiment can therefore improve the processing efficiency of the computer system. Moreover, because the virtual tick CPU 241 or 242 to which the tick CPU 105 is allocated performs the timer processing in real-time compliance with the tick interrupt issued by the interrupt controller 106, it is possible to maintain the real-time status of the timer processing of the virtual machines 110 and 111.

<3> Modification Examples (1) The above Embodiments 1 and 2 have described an example where the memory 102, the CPUs 103, 201 and 202, the cache memory 104, the tick CPU 105, the interrupt controller 106, and the hardware timer 107 are separate devices. The present invention, however, is not limited in this way. For example, all of such devices may be integrated into one system LSI (large scale integration). Alternatively, all of such devices excluding the memory 102 and the hardware timer 107 may be integrated into one system LSI.

(2) The above Embodiments 1 and 2 have described an example where two virtual machines are enabled. The present invention, however, is not limited to such a structure. For example, three or more virtual machines may be enabled. Alternatively, one virtual machine may be enabled.

(3) The above Embodiments 1 and 2 have described an example where each of the virtual machines 110 and 111 performs two tasks in parallel. The present invention, however, is not limited in this way. For example, each of the virtual machines 110 and 111 may perform one task. Alternatively, each of the virtual machines 110 and 111 may perform three or more tasks in parallel.

(4) The above Embodiments 1 and 2 have described an example where the computer system includes the hardware timer 107 and the tick CPU 105 that executes only a tick handler based on an interrupt request signal issued by the hardware timer 107. The present invention, however, is not limited to such a structure. For example, the computer system may include a video display processor (VDP) that performs vertical synchronization interrupt processing based on a vertical synchronization interrupt request signal, and a dedicated processor that is exclusively used to perform data transfer based on an interrupt request signal issued in a predetermined cycle.

With the above structure pertaining to the present modification example, the dedicated processor performs interrupt processing, thus reducing the overhead associated with the switching between computer processing performed by the virtual machine 110 and computer processing performed by the virtual machine 111.

(5) The above Embodiments 1 and 2 have described an example where the computer system enables the hypervisor 112 that manages the operating systems of the respective virtual machines 110 and 111. The present invention, however, is not limited to such a structure. For example, the computer system may be structured in such a manner that a host operating system manages (i) the virtual machine 110 and (ii) a guest operating system that manages the virtual machine 111. In this case, the host operating system realizes the functions of the hypervisor 112.

(6) The above Embodiments 1 and 2 have described an example where the operating system information is appended to each of the virtual tick CPUs 241 and 242. The present invention, however, is not limited in this way. For example, the CPU management unit 142 may store therein the operating system information.

(7) The above Embodiments 1 and 2 have described an example where the tick CPU 105 is configured with a dedicated processor that has a smaller scale and consumes a smaller amount of power than the general-purpose processor of the CPU 103 does. The present invention, however, is not limited in this way. The tick CPU 105 may be configured with a general-purpose processor.

(8) The above Embodiment 2 has described an example where the two CPUs 201 and 202 are configured with processors that have the same operational clock frequency, consume the same amount of power, exert the same computing performances, and have the same instruction set architecture. The present invention, however, is not limited to such a structure. For example, the CPUs 201 and 202 may be configured with processors that have the same instruction set architecture but have different operational clock frequencies, consume different amounts of power, and exert different computing performances.

(9) The above Embodiment 2 has described an example where the computer system includes two CPUs 201 and 202. The present invention, however, is not limited to such a structure. For example, the computer system may include three or more CPUs (not illustrated).

(10) The above Embodiment 2 has described an example where both of the virtual machines 110 and 111 are managed by the operating systems compatible with SMP. The present invention, however, is not limited to such a structure. For example, only one of the virtual machines 110 and 111 may be managed by an operating system compatible with SMP.

(11) The above Embodiments 1 and 2 have described a structure in which an input/output pin of the tick CPU 105 is connected to the cache memory 104. The present invention, however, is not limited to such a structure. For example, the input/output pin of the tick CPU 105 may be directly connected to the buses 101. Alternatively, provided the tick CPU 105 has multiple input/output pins, only a part of the input/output pins may be connected to the cache memory 104, and the rest of the input/output pins may be directly connected to the buses 101.

The present modification example can reduce the amount of power consumed by the cache memory 104, thus lowering the amount of power consumed by the computer system as a whole.

(12) The above Embodiments 1 and 2 have described an example where the processing for updating the values counted by the system timers of the virtual machines 110 and 111 is performed. The present invention, however, is not limited to such a structure. The present invention is also applicable to interrupt processing that brings about some sort of adverse effects when the execution thereof is delayed. Moreover, the present invention is also applicable to processing that (i) is based on an interrupt request issued in a shorter cycle than the cycle in which the switching between the virtual CPUs is performed, and (ii) in order to sufficiently maintain the real-time status of the interrupt request, cannot avoid the overhead associated with the switching between the virtual CPUs.

<4> Other Notes

Each function block pertaining to the present invention is typically realized as software, but may be realized as an integrated circuit such as LSI. This integrated circuit may be called IC, a system LSI, an ultra LSI, a super LSI or the like, depending on the level of the integration. In addition, the method for assembling integrated circuits is not limited to LSI, and a dedicated circuit or a general-purpose processor may be used. A field programmable gate array (FPGA), which is programmable after the LSI is manufactured, or a reconfigurable processor, which allows reconfiguration of the connection and setting of circuit cells inside the LSI, may be used. Furthermore, if technology for assembling integrated circuits that replaces the LSI emerges, owing to advances in semiconductor technology or to another derivative technology, the integration of function blocks may naturally be accomplished using such technology. The application of biotechnology or the like is possible.

In a computer system that enables a plurality of virtual machines, or in a multi-operating system, the present invention can reduce the overhead associated with processing for updating a value counted by a system timer (timer processing). Furthermore, in the present invention, the processing for updating a value counted by a system timer is performed with a dedicated processor that is exclusively for such processing and that consumes a smaller amount of power than a general-purpose processor does. This can reduce the amount of power consumed by the entire system. That is to say, the present invention is useful as a method for timer processing in a computer system that enables a plurality of virtual machines with a few physical resources, or in a multi-operating system that executes a plurality of operating systems.

REFERENCE SIGNS LIST 101 bus
102 memory
103, 201, 202 CPU (first processing device)
104 cache memory
105 tick CPU (second processing device)
106 interrupt controller
107 hardware timer
110, 111 virtual machine
112 hypervisor
140 interrupt processing unit
141 VM scheduler
142 CPU management unit (processing device management unit)
143, 144 virtual CPU
241, 242 virtual tick CPU
OS1, OS2 operating system
T11, T12, T21, T22 task
Tb1, Tb2 interrupt table
ST1, ST2 system timer

The invention claimed is:

1. A computer system that causes a plurality of virtual processing units to execute a plurality of virtual machines, the plurality of virtual processing units including a first virtual processing unit and a second virtual processing unit, the plurality of virtual machines including a first virtual machine and a second virtual machine, the computer system including:
   a first processing device comprising a physical processor that performs computer processing for the first processing device, the first processing device being allocated to (i) the first virtual processing unit when the first virtual processing unit performs first processing of the first virtual machine, and (ii) the second virtual processing unit when the second virtual processing unit performs first processing of the second virtual machine;
   a second processing device comprising a tick processor with a smaller scale computer architecture than the first physical processor and that performs computer processing for the second processing device, the second processing device being dedicated to second processing of the first virtual machine and to second processing of the second virtual machine, the second processing device being allocated to (i) the first virtual processing unit upon receiving a first interrupt request for causing the first virtual processing unit to perform the second processing of the first virtual machine, and (ii) the second virtual processing unit upon receiving a second interrupt request for causing the second virtual processing unit to perform the second processing of the second virtual machine; and
   an interrupt controller configured to issue one of the first interrupt request and the second interrupt request to the second processing device.

2. The computer system of claim 1, wherein the second processing of the first virtual machine and the second processing of the second virtual machine are to advance values counted by system timers that define internal times of a plurality of operating systems which manage, in one-to-one correspondence, the plurality of virtual machines.

3. The computer system of claim 1 further comprising a processing device management unit configured to, when the interrupt controller issues the first interrupt request to the second processing device while the first processing device is allocated to the first virtual processing unit, (i) cause the first processing device to stop operating, (ii) cancel the allocation of the first processing device to the first virtual processing unit, and (iii) allocate the second processing device to the first virtual processing unit.

4. The computer system of claim 3, wherein when the interrupt controller issues the first interrupt request to the second processing device while the second processing device is allocated to the second virtual processing unit, the processing device management unit allocates the second processing device to the first virtual processing unit.

5. The computer system of claim 1, wherein the plurality of virtual processing units further include a third virtual processing unit,
   the first virtual machine is (i) managed by an operating system compatible with multiprocessing and (ii) executed by the first virtual processing unit and the third virtual processing unit, and
   upon receiving a third interrupt request for causing the third virtual processing unit to perform the second processing of the first virtual machine, the second processing device is allocated to the third virtual processing unit.

6. The computer system of claim 1, wherein the second processing device consumes a smaller amount of power than the first processing device does.

7. A processing method used in a computer system that causes a plurality of virtual processing units to execute a plurality of virtual machines, the plurality of virtual processing units including a first virtual processing unit and a second virtual processing unit, the plurality of virtual machines including a first virtual machine and a second virtual machine, the computer system including: (i) a first processing device comprising a physical processor that performs computer processing, the first processing device being allocated to (a) the first virtual processing unit when the first virtual processing unit performs first processing of the first virtual machine, and (b) the second virtual processing unit when the second virtual processing unit performs first processing of the second virtual machine; (ii) a second processing device comprising a tick processor with a smaller scale computer architecture than the first physical processor and that performs computer processing for the second processing device, the second processing device being dedicated to second processing of the first virtual machine and to second processing of the second virtual machine, the second processing device being allocated to (a) the first virtual processing unit upon receiving a first interrupt request for causing the first virtual processing unit to perform the second processing of the first virtual machine, and (b) the second virtual processing unit upon receiving a second interrupt request for causing the second virtual processing unit to perform the second processing of the second virtual machine; and (iii) an interrupt controller configured to issue one of the first interrupt request and the second interrupt request to the second processing device, the processing method comprising:
   a processing device switching step of, when the interrupt controller issues the first interrupt request to the second processing device while the first processing device is allocated to the first virtual processing unit, (i) causing the first processing device to stop operating, (ii) cancelling the allocation of the first processing device to the first virtual processing unit, and (iii) allocating the second processing device to the first virtual processing unit.

8. The processing method of claim 7, wherein
when the interrupt controller issues the second interrupt request to the second processing device while the first processing device is allocated to the first virtual processing unit, the processing device switching step allocates the second processing device to the second virtual processing unit.

9. An integrated circuit for a computer system that causes a plurality of virtual processing units to execute a plurality of virtual machines, the plurality of virtual processing units including a first virtual processing unit and a second virtual processing unit, the plurality of virtual machines including a first virtual machine and a second virtual machine, the integrated circuit comprising:
a first processing device comprising a physical processor that performs computer processing, the first processing device being allocated to (i) the first virtual processing unit when the first virtual processing unit performs first processing of the first virtual machine, and (ii) the second virtual processing unit when the second virtual processing unit performs first processing of the second virtual machine;
a second processing device comprising a tick processor with a smaller scale computer architecture than the first physical processor and that performs computer processing for the second processing device, the second processing device being dedicated to second processing of the first virtual machine and to second processing of the second virtual machine, the second processing device being allocated to (i) the first virtual processing unit upon receiving a first interrupt request for causing the first virtual processing unit to perform the second processing of the first virtual machine, and (ii) the second virtual processing unit upon receiving a second interrupt request for causing the second virtual processing unit to perform the second processing of the second virtual machine; and
an interrupt controller configured to issue one of the first interrupt request and the second interrupt request to the second processing device.

* * * * *